United States Patent
Yoshida et al.

(10) Patent No.: US 9,759,328 B2
(45) Date of Patent: Sep. 12, 2017

(54) SPHERICAL ANNULAR SEAL MEMBER AND METHOD OF MANUFACTURING THE SAME

(71) Applicant: OILES CORPORATION, Minato-ku, Tokyo (JP)

(72) Inventors: Atsushi Yoshida, Fujisawa (JP); Eiji Satou, Fujisawa (JP); Shin-ichi Shionoya, Fujisawa (JP); Ryota Koibuchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 295 days.

(21) Appl. No.: 14/429,098

(22) PCT Filed: Aug. 22, 2013

(86) PCT No.: PCT/JP2013/004967
§ 371 (c)(1),
(2) Date: Mar. 18, 2015

(87) PCT Pub. No.: WO2014/061184
PCT Pub. Date: Apr. 24, 2014

(65) Prior Publication Data
US 2015/0267814 A1    Sep. 24, 2015

(30) Foreign Application Priority Data
Oct. 16, 2012  (JP) .................. 2012-229114

(51) Int. Cl.
*F16J 15/12* (2006.01)
*F01N 13/18* (2010.01)
(Continued)

(52) U.S. Cl.
CPC ........... *F16J 15/104* (2013.01); *C09K 3/1009* (2013.01); *C10M 103/00* (2013.01);
(Continued)

(58) Field of Classification Search
CPC ....... F16J 15/126; F16J 15/0812; F16L 23/18; F01N 13/1827
See application file for complete search history.

(56) References Cited

U.S. PATENT DOCUMENTS 4,607,851 A    8/1986  Usher
5,997,979 A *  12/1999 Kashima ................ F16J 15/126
                                                        277/602
(Continued)

FOREIGN PATENT DOCUMENTS

CN     1190710 A     8/1998
CN   101102891 A     1/2008
(Continued)

OTHER PUBLICATIONS

Chinese Office Action dispatched Feb. 15, 2016 in Chinese Application No. 201380053847.X, with English translation (16 pages).
(Continued)

Primary Examiner — Gilbert Lee
(74) Attorney, Agent, or Firm — Nixon & Vanderhye P.C.

(57) ABSTRACT

A spherical annular seal member 38 is used in an exhaust pipe joint and includes a spherical annular base member 36 defined by a cylindrical inner surface 32, a partially convex spherical surface 33, large- and small-diameter side annular end faces 34 and 35 of the partially convex spherical surface 33, and an outer layer 37 formed integrally on the partially convex spherical surface 33 of the spherical annular base member 36. The spherical annular base member 36 includes a reinforcing member made from a metal wire net 5 and a heat-resistant material containing expanded graphite filling meshes of the metal wire net 5 of this reinforcing member and compressed in such a manner as to be formed integrally with this reinforcing member in mixed form. In the outer
(Continued)

layer 37, the reinforcing member, the heat-resistant material, and the solid lubricant are integrated in mixed form.

27 Claims, 10 Drawing Sheets

(51) Int. Cl.
  *F16J 15/10*  (2006.01)
  *C09K 3/10*  (2006.01)
  *C10M 103/00*  (2006.01)
  *C10M 107/38*  (2006.01)
  *F16L 23/18*  (2006.01)

(52) U.S. Cl.
  CPC .......... *C10M 107/38* (2013.01); *F16J 15/102* (2013.01); *F16J 15/108* (2013.01); *F16J 15/126* (2013.01); *F16L 23/18* (2013.01); *C09K 2200/0208* (2013.01); *C10M 2201/003* (2013.01); *C10M 2213/0623* (2013.01); *F01N 13/1827* (2013.01)

(56) References Cited

U.S. PATENT DOCUMENTS

| | | |
|---|---|---|
| 6,129,362 A | 10/2000 | Kashima et al. |
| 2007/0269674 A1 | 11/2007 | Yanase et al. |
| 2010/0253011 A1 | 10/2010 | Maeda et al. |
| 2010/0270754 A1 | 10/2010 | Kubota et al. |
| 2013/0187347 A1* | 7/2013 | Kaida .................. F01N 13/1827 277/627 |
| 2014/0027986 A1* | 1/2014 | Miyashita ........... F01N 13/1827 277/626 |
| 2014/0361496 A1* | 12/2014 | Miyashita ........... F01N 13/1827 277/608 |

FOREIGN PATENT DOCUMENTS

| | | |
|---|---|---|
| CN | 101903690 A | 12/2010 |
| JP | 54-076759 | 6/1979 |
| JP | 04-048973 | 8/1992 |
| JP | 10-220585 | 8/1998 |
| JP | 10-231934 | 9/1998 |
| JP | 2012-107686 | 6/2012 |
| JP | 2012-180920 | 9/2012 |
| WO | WO 2009/072295 | 6/2009 |

OTHER PUBLICATIONS

International Search Report for PCT/JP2013/004967 mailed Nov. 26, 2013, 4 pages.

\* cited by examiner

SPHERICAL ANNULAR SEAL MEMBER AND METHOD OF MANUFACTURING THE SAME

This application is the U.S. national phase of International Application No. PCT/JP2013/004967, filed 22 Aug. 2013, which designated the U.S. and claims priority to JP Patent Application No. 2012-229114 filed 16 Oct. 2012, the entire contents of each of which are hereby incorporated by reference.

TECHNICAL FIELD

The present invention relates to a spherical annular seal member used in a spherical pipe joint for an automobile exhaust pipe and a method of manufacturing the same.

BACKGROUND ART

As for exhaust gases of an automobile engine, in FIG. 19 which shows one example of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, there is a possibility of causing a fatigue failure in the exhaust system members, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior of the automobile.

PRIOR ART DOCUMENTS

Patent Documents

Patent Document 1: JP-A-54-76759
Patent Document 2: JP-B-4-48973

SUMMARY OF THE INVENTION

Problems to be Solved by the Invention

As one example of the above-described vibration absorbing mechanism, it is possible to cite an exhaust pipe joint described in Patent Document 1 and a seal member which is used in that joint. The seal member used in the exhaust pipe joint described in Patent Document 1 has advantages in that, in comparison with a bellows type joint, it makes it possible to attain a reduction in the manufacturing cost and excels in durability. However, this seal member is formed such that a heat-resistant material made from expanded graphite and a reinforcing member made from a metal wire net are compressed to fill meshes of the metal wire net of the reinforcing member with the heat-resistant material, and this heat-resistant material and the reinforcing member are thereby integrated in mixed form. As such, this seal member has the problem of occurrence of abnormal noise due to the presence of the heat-resistant material at the surface of the partially convex spherical surface which comes into slidable contact with the mating member, in addition to the problem of leakage of exhaust gases through the seal member itself owing to such as the proportion of the reinforcing member to the heat-resistant material and the degree of compression of the heat-resistant material and the reinforcing member. For example, if the proportion of the reinforcing member to the heat-resistant material is large, and the degree of compression of the heat-resistant material is low, there are possibilities that initial leakage can occur due to a decline in the degree of sealing by the heat-resistant material with respect to infinitesimal passages (gaps) occurring around the reinforcing member, and that exhaust gases can leak in an early stage due to such as the oxidative wear of the heat-resistant material under high temperature. In addition, if the rate of exposure of the heat-resistant material with respect to the reinforcing member at the partially convex spherical surface is very large, the stick-slip phenomenon can occur, possibly causing the generation of abnormal noise ascribable to that stick-slip phenomenon.

As a seal member for overcoming the drawbacks of such a seal member, a seal member disclosed in Patent Document 2 is formed by superposing a reinforcing member made from a metal wire net on a sheet-like heat-resistant material made from expanded graphite with a polytetrafluoroethylene resin filled therein and coated thereon, so as to form a belt-shaped composition, by convoluting the belt-shaped composition such that the surface with the polytetrafluoroethylene resin filled in and coated thereon is placed on the outer side, so as to form a hollow cylindrical laminate, and by subjecting the hollow cylindrical laminate to compression molding along the axial direction of the laminate such that the surface with the polytetrafluoroethylene resin filled therein and coated thereon is exposed on the outer peripheral surface constituting a sliding surface (sealing surface). As for this seal member, the polytetrafluoroethylene resin coated and formed on the surface exhibits operational effects such as the reduction of the coefficient of friction and the prevention of transfer of the heat-resistant material for forming the base member onto the surface of a mating member. Further, since the frictional resistance of the polytetrafluoroethylene resin does not exhibit negative resistance with respect to the sliding velocity, an additional effect is obtained in that the generation of self-excited vibration based on the slick-slip phenomenon (adhesion-slippage) can be suppressed, coupled with the above-described operational effects, thereby contributing to the prevention of generation of abnormal noise.

The seal member described in the above-described Patent Document 2 overcomes the problems of the seal member described in Patent Document 1. However, the effect that the generation of self-excited vibration based on the slick-slip phenomenon is suppressed and a contribution is thereby made to the prevention of generation of abnormal noise, which is the operational effect of the seal member disclosed in Patent Document 2, is limited to the use in which the ambient temperature acting on the seal member is less than the melting point (327° C.) of the polytetrafluoroethylene resin, and, in the use at an ambient temperature (high-temperature region) exceeding that melting point, there inevitably occur the generation of self-excited vibration attributable to the slick-slip phenomenon due to the polytetrafluoroethylene resin, as well as the generation of abnormal noise owing to the consequent propagation of vibration to the exhaust pipe.

The present invention has been devised in view of the above-described aspects, and its object is to provide a spherical annular seal member which makes it possible to alleviate the self-excited vibration and eliminate the generation of abnormal noise and exhibits stable sealing characteristics in sliding with a mating member even when used at an ambient temperature exceeding the melting point of the polytetrafluoroethylene resin, as well as a method of manufacturing the same.

Means for Solving the Problems

A spherical annular seal member in accordance with the present invention is a spherical annular seal member for use in an exhaust pipe joint, comprising: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite and compressed in such a manner as to fill meshes of the metal wire net of the reinforcing member and to be integrated with the reinforcing member in mixed form, wherein, in the outer layer, a heat-resistant material containing expanded graphite, a solid lubricant consisting of a lubricating composition containing a polytetrafluoroethylene resin, a tetrafluoroethylene-hexafluoropropylene copolymer, and hexagonal boron nitride, and a reinforcing member made from a metal wire net are compressed such that the heat-resistant material and the solid lubricant are filled in meshes of the reinforcing member, and such that the reinforcing member, the heat-resistant material, and the solid lubricant are integrated in mixed form, and wherein, in a ternary composition diagram of the polytetrafluoroethylene resin, the tetrafluoroethylene-hexafluoropropylene copolymer, and the hexagonal boron nitride, a composition ratio of the polytetrafluoroethylene resin, the tetrafluoroethylene-hexafluoropropylene copolymer, and the hexagonal boron nitride in the lubricating composition falls within a numerical range corresponding to an interior region bounded by a quadrangle having as vertices a composition point with 10% by mass of the polytetrafluoroethylene resin, 10% by mass of the tetrafluoroethylene-hexafluoropropylene copolymer, and 80% by mass of the hexagonal boron nitride, a composition point with 10% by mass of the polytetrafluoroethylene resin, 45% by mass of the tetrafluoroethylene-hexafluoropropylene copolymer, and 45% by mass of the hexagonal boron nitride, a composition point with 45% by mass of the polytetrafluoroethylene resin, 45% by mass of the tetrafluoroethylene-hexafluoropropylene copolymer, and 10% by mass of the hexagonal boron nitride, and a composition point with 40% by mass of the polytetrafluoroethylene resin, 10% by mass of the tetrafluoroethylene-hexafluoropropylene copolymer, and 50% by mass of the hexagonal boron nitride.

According to the spherical annular seal member in accordance with the present invention, since the composition ratio of the lubricating composition falls within a numerical range corresponding to an interior region bounded by a quadrangle having the four composition points as vertices in the ternary composition diagram, there is no possibility of causing damage to the surface of the mating member, and particularly since the solid lubricant consisting of the lubricating composition contains the polytetrafluoroethylene resin (hereafter referred to as PTFE), the tetrafluoroethylene-hexafluoropropylene copolymer (hereafter referred to as FEP), and the hexagonal boron nitride (hereafter referred to as h-BN), which have different melting points respectively, it is possible to alleviate the self-excited vibration and prevent the generation of abnormal noise, and it is possible to obtain excellent sliding characteristics in a high-temperature region.

Namely, according to the present invention, in the use of the spherical annular seal member in such a temperature region that while FEP melts and softens, and manifests elasticity due to its viscosity, PTFE does not melt and is in a solid state, the elasticity of FEP is suppressed by PTFE which is in the solid state, so that stick-slip is restrained in sliding with the mating member. Meanwhile, in the use of the spherical annular seal member above a temperature at which FTPE melts, softens, and manifests elasticity due to its viscosity, FEP further melts and its viscosity substantially decreases, resulting in an increase in lubricity and suppressing elasticity due to the viscosity of PTFE, so that stick-slip is similarly restrained in sliding with the mating member. As such, in the use of the spherical annular seal member in a range from a low-temperature region in which PTFE and FEP do not melt to a high-temperature region in which PTFE and FEP melt, it is possible to alleviate the self-excited vibration and prevent the generation of abnormal noise by virtue of the synergistic effect of PTFE and FEP. Furthermore, by virtue of the respective high lubricities of PTFE, FEP, and h-BN, particularly the high lubricity of h-BN at high temperature, smooth sliding with the mating member with low frictional resistance is made possible even at high temperature, and stable sealing characteristics are exhibited through cooperation between the expanded graphite and the metal wire net.

In the ternary composition diagram of PTFE, FEP, and h-BN, the composition ratio of PTFE, FEP, and h-BN in the lubricating composition preferably falls within a numerical range corresponding to an interior region bounded by a hexagon having as vertices a composition point with 25% by mass of PTFE, 15% by mass of FEP, and 60% by mass of h-BN, a composition point with 12% by mass of PTFE, 28% by mass of FEP, and 60% by mass of h-BN, a composition point with 10% by mass of PTFE, 40% by mass of FEP, and 50% by mass of h-BN, a composition point with 20% by mass of PTFE, 40% by mass of FEP, and 40% by mass of h-BN, a composition point with 38% by mass of PTFE, 22% by mass of FEP, and 40% by mass of h-BN, and a composition point with 35% by mass of PTFE, 15% by mass of FEP, and 50% by mass of h-BN. More preferably, PTFE is 25% by mass, FEP is 25% by mass, and h-BN is 50% by mass.

In addition, in the present invention, the lubricating composition may contain hydrated alumina at a ratio of not more than 20% by mass. Such hydrated alumina itself exhibits no lubricity, but exhibits an effect in the formation of a firm outer layer by improving the adhesion of the solid lubricant onto the partially convex spherical surface of the spherical annular base member, and has the effect of exhibiting the role of deriving the lubricity of h-BN by promoting sliding between layers of plate crystals of h-BN.

The hydrated alumina is a compound which is expressed by a composition formula: $Al_2O_3 \cdot nH_2O$ (in the composition formula, $0<n<3$). In the composition formula, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot nH_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like. At least one of these may be suitably used.

In the spherical annular seal member in accordance with the present invention, in the spherical annular base member and the outer layer, a reinforcing member made from a metal wire net may be contained at a ratio of 40 to 65% by mass, and a solid lubricant and a heat-resistant material containing expanded graphite may be contained at a ratio of 35 to 60% by mass, and the heat-resistant material and the solid lubricant in the spherical annular base member and the outer layer may preferably have a density of 1.20 to 2.00 $Mg/m^3$. Further, in the outer layer, the reinforcing member made from the metal wire net may be contained at a ratio of 60 to 75% by mass, and the solid lubricant and the heat-resistant material containing expanded graphite may be contained at a ratio of 25 to 40% by mass.

In the spherical annular seal member in accordance with the present invention, the heat-resistant material may contain, in addition to expanded graphite, as an oxidation inhibitor 0.1 to 16.0% by mass of a phosphate or 0.05 to 5% by mass of phosphorus pentoxide, or 0.1 to 16.0% by mass of a phosphate and 0.05 to 5.0% by mass of phosphorus pentoxide.

The heat-resistant material containing at least one of a phosphate and phosphorus pentoxide, which serves as an oxidation inhibitor, and expanded graphite is able to improve the heat resistance and oxidative wear characteristics of the spherical annular seal member itself, and permits the use of the spherical annular seal member in a high-temperature region.

In the spherical annular seal member in accordance with the present invention, since the outer layer may have an outer surface which is formed by an exposed surface where areas constituted by the reinforcing member and areas constituted by the solid lubricant are present in mixed form. In this case, the areas constituted by the solid lubricant in the outer surface can be held by the areas constituted by the reinforcing member, and it is possible to appropriately effect both the transfer of the solid lubricant from the outer surface of the outer layer onto the surface of the mating member and the scraping off of an excessive solid lubricant transferred onto the surface of the mating member, with the result that it is possible to ensure smooth sliding over extended periods of time, and the generation of abnormal noise in sliding with the mating member can be further reduced. In the present invention, the outer layer may alternatively have an outer surface formed into a smooth surface constituted by the solid lubricant covering the reinforcing member. In this case, it is possible to satisfactorily ensure smooth sliding with the mating member which is in contact (slides) with the outer surface of the outer layer.

In the present invention, the solid lubricant consisting of a lubricating composition may not be sintered, but may be sintered at a temperature exceeding the melting point of FEP.

A method of manufacturing a spherical annular seal member in accordance with the present invention for use in an exhaust pipe joint and including a spherical annular base member defined by a cylindrical inner surface, a partially convex spherical surface, and large- and small-diameter side annular end faces of the partially convex spherical surface, and an outer layer formed integrally on the partially convex spherical surface of the spherical annular base member, comprises the steps of: (a) preparing an expanded graphite sheet serving as a heat-resistant material; (b) preparing a metal wire net serving as a reinforcing member and obtained by weaving or knitting a fine metal wire, and, after forming a superposed assembly by superposing the metal wire net on the expanded graphite sheet, convoluting the superposed assembly into a hollow cylindrical shape, to thereby form a tubular base member; (c) preparing an aqueous dispersion of a lubricating composition consisting of a PTFE powder, a FEP powder, a h-BN powder, a surfactant, and water; (d) preparing another expanded graphite sheet serving as a heat-resistant material, applying the aqueous dispersion onto one surface of the other expanded graphite sheet, and drying the same, to thereby form on a surface of the other expanded graphite sheet a coating layer of a solid lubricant consisting of a PTFE, a FEP, and a h-BN; (e) superposing the other expanded graphite sheet having the coating layer on another metal wire net serving as a reinforcing member and obtained by weaving or knitting a fine metal wire, and pressurizing a superposed assembly of the other expanded graphite sheet and the other metal wire net by a pair of rollers, to thereby form a flattened outer-layer forming member in which the other expanded graphite sheet and the coating layer are filled in meshes of the other metal wire net; (f) convoluting the outer-layer forming member around an outer peripheral surface of the tubular base member with its coating layer facing outside, to thereby form a cylindrical preform; and (g) fitting the cylindrical preform over an outer peripheral surface of a core of a die, placing the core in the die, and subjecting the cylindrical preform to compression molding in the die in an axial direction of the core, wherein the spherical annular base member is formed so as to be provided with structural integrity as the expanded graphite sheet and the metal wire net are compressed and intertwined with each other, and wherein, in the outer layer, the other expanded graphite sheet, the coating layer, and the other metal wire net are compressed such that the other expanded graphite sheet and the coating layer are filled in meshes of the other metal wire net, and such that the other metal wire net, the other expanded graphite sheet, and the coating layer are integrated in mixed form.

According to the method of manufacturing a spherical annular seal member in accordance with the present invention, it is possible to manufacture a spherical annular seal member which, even when used at an ambient temperature higher than the melting point of FEP or used at an ambient temperature higher than the melting point of PTFE, makes it possible to alleviate self-excited vibration and eliminate generation of abnormal noise in sliding with the mating member, and exhibits stable sealing characteristics.

In the method of manufacturing a spherical annular seal member in accordance with the present invention, the aqueous dispersion of the lubricating composition which is coated on one surface of the other expanded graphite sheet is composed of a PTFE powder with an average particle size of 0.01 to 1 μm which is obtained by an emulsion polymerization method, an FEP powder with an average particle size of 0.01 to 1 μm, an h-BN powder with an average particle size of 0.1 to 20 μm, a surfactant, and water. A hydrated alumina powder may be further contained in this aqueous dispersion, and an aqueous organic solvent may be contained in this aqueous dispersion.

In the aqueous dispersion, a powder for a lubricating composition containing the PTFE powder, the FEP powder, and the h-BN powder and having a composition ratio which, in the ternary composition diagram, falls within a numerical range corresponding to an interior region bounded by a quadrangle having as vertices a composition point with 10% by mass of PTFE, 10% by mass of FEP, and 80% by mass of h-BN, a composition point with 10% by mass of PTFE, 45% by mass of FEP, and 45% by mass of h-BN, a composition point with 45% by mass of PTFE, 45% by mass of FEP, and 10% by mass of h-BN, and a composition point with 40% by mass of PTFE, 10% by mass of FEP, and 50% by mass of h-BN, may be contained together with a surfactant and water. Preferably, a powder for a lubricating composition containing the PTFE powder, the FEP powder, and the h-BN powder and having a composition ratio which, in the ternary composition diagram, falls within a numerical range corresponding to an interior region bounded by a hexagon having as vertices a composition point with 25% by mass of PTFE, 15% by mass of FEP, and 60% by mass of h-BN, a composition point with 12% by mass of PTFE, 28% by mass of FEP, and 60% by mass of h-BN, a composition point with 10% by mass of PTFE, 40% by mass of FEP, and 50% by mass of h-BN, a composition point with 20% by mass of PTFE, 40% by mass of FEP, and 40% by mass of h-BN, a composition point with 38% by mass of PTFE, 22% by mass of FEP, and 40% by mass of h-BN, and a composition point with 35% by mass of PTFE, 15% by mass of FEP, and 50% by mass of h-BN, is contained together with a surfactant and water. More preferably, a powder for a lubricating composition containing 25% by mass of the PTFE powder, 25% by mass of the FEP powder, and 50% by mass of the h-BN powder is contained together with a surfactant and water.

The powder for a lubricating composition in the aforementioned aqueous dispersion may further contain a hydrated alumina powder at a ratio of not more than 20% by mass. The content of the hydrated alumina powder is preferably 1 to 10% by mass, more preferably 2 to 3% by mass.

In the method of manufacturing a spherical annular seal member in accordance with the present invention, the coating layer consisting of the lubricating composition formed by applying the aqueous dispersion to one surface of the other expanded graphite sheet by means of roller coating, brushing, spraying, or the like may be sintered, after being dried, in a heating furnace at a temperature higher than the melting point of FEP, and the above-described steps (e), (f), and (g) may be performed by using the sintered coating layer as the coating layer. In this case, the spherical annular base member is formed so as to be provided with structural integrity as the expanded graphite sheet and the metal wire net are compressed and intertwined with each other, and wherein, in the outer layer, the other expanded graphite sheet, the sintered coating layer, and the other metal wire net are compressed such that the other expanded graphite sheet and the sintered coating layer are filled in meshes of the other metal wire net, and such that the other metal wire net, the other expanded graphite sheet, and the sintered coating layer are integrated in mixed form.

The sintering temperature is within a range of (T) to (T+150° C.), preferably (T+5° C.) to (T+135° C.), more preferably (T+10° C.) to (T+125° C.), with respect to the melting point T (=245° C.) of FEP. If the sintering temperature is excessively low, it becomes difficult to form a uniform sintered coating layer of the lubricating composition, whereas if the sintering temperature is excessively high, thermal deterioration of the lubricating composition is liable to occur.

In the method of manufacturing a spherical annular seal member in accordance with the present invention, in the above-described step (e), the other expanded graphite sheet may be inserted between layers constituted by the other metal wire net, and the other metal wire net with the other expanded graphite sheet inserted between the layers may be fed into a nip between a pair of rollers so as to be pressurized, such that the other expanded graphite sheet and the coating layer are filled in meshes of the other metal wire net, to thereby form a flattened outer-layer forming member having a surface in which areas constituted by the other metal wire net and areas constituted by the coating layer are exposed in mixed form. In this case, the outer surface of the outer layer may be formed into a smooth surface in which areas constituted by the metal wire net and areas constituted by the coating layer are present in mixed form.

Furthermore, in the method in accordance with the present invention, the outer surface of the outer layer may be formed into a smooth surface constituted by the solid lubricant covering the reinforcing member.

In the method of manufacturing the spherical annular seal member in accordance with the present invention, in the spherical annular base member and the outer layer, a reinforcing member made from a metal wire net may be contained at a ratio of 40 to 65% by mass, and a solid lubricant and a heat-resistant material containing expanded graphite may be contained at a ratio of 35 to 60% by mass, and the heat-resistant material and the solid lubricant in the spherical annular base member and the outer layer may preferably have a density of 1.20 to 2.00 $Mg/m^3$. Further, in the outer layer, the reinforcing member made from the metal wire net may be contained at a ratio of 60 to 75% by mass, and the solid lubricant and the heat-resistant material containing expanded graphite may be contained at a ratio of 25 to 40% by mass.

In the method of manufacturing the spherical annular seal member in accordance with the present invention, the heat-resistant material may contain, in addition to expanded graphite, as an oxidation inhibitor 0.1 to 16.0% by mass of a phosphate or 0.05 to 5% by mass of phosphorus pentoxide, or 0.1 to 16.0% by mass of a phosphate and 0.05 to 5.0% by mass of phosphorus pentoxide.

Another spherical annular seal member in accordance with the present invention for use in an exhaust pipe joint, comprises: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite and compressed in such a manner as to fill meshes of the metal wire net of the reinforcing member and to be integrated with the reinforcing member in mixed form, and wherein, in the outer layer, a heat-resistant material containing expanded graphite, a solid lubricant consisting of a lubricating composition containing PTFE, at least one kind of a molten fluorocarbon resin having a melting temperature different from that of PTFE, and h-BN, and a reinforcing member made from a metal wire net are compressed such that the heat-resistant material and the solid lubricant are filled in meshes of the reinforcing member, and such that the reinforcing member, the heat-resistant material, and the solid lubricant are integrated in mixed form.

In such another spherical annular seal member in accordance with the present invention, by virtue of the synergistic effect, similar to the above-described one, of PTFE and at least one kind of a molten fluorocarbon resin having a melting temperature different from that of PTFE, it is possible to alleviate the self-excited vibration and prevent the generation of abnormal noise. Moreover, by virtue of the respective high lubricities of at least PTFE and h-BN, particularly the high lubricity of h-BN at high temperature, smooth sliding with the mating member with low frictional resistance is made possible even at high temperature, and stable sealing characteristics are exhibited through cooperation between the expanded graphite and the metal wire net.

In the case of this other spherical annular seal member, the at least one kind of a molten fluorocarbon resin having a melting temperature different from that of PTFE may include FEP.

In the case of the other spherical annular seal member in accordance with the present invention containing such an FEP, in a ternary composition diagram of PTFE, FEP, and h-BN, a composition ratio of PTFE, FEP, and h-BN in the lubricating composition may fall within a numerical range corresponding to an interior region bounded by a quadrangle having as vertices a composition point with 10% by mass of PTFE, 10% by mass of FEP, and 80% by mass of h-BN, a composition point with 10% by mass of PTFE, 45% by mass of FEP, and 45% by mass of h-BN, a composition point with 45% by mass of PTFE, 45% by mass of FEP, and 10% by mass of h-BN, and a composition point with 40% by mass of PTFE, 10% by mass of FEP, and 50% by mass of h-BN. Preferably, in the ternary composition diagram of PTFE, FEP, and h-BN, the composition ratio of PTFE, FEP, and h-BN in the lubricating composition falls within a numerical range corresponding to an interior region bounded by a hexagon having as vertices a composition point with 25% by mass of PTFE, 15% by mass of FEP, and 60% by mass of h-BN, a composition point with 12% by mass of PTFE, 28% by mass of FEP, and 60% by mass of h-BN, a composition point with 10% by mass of PTFE, 40% by mass of FEP, and 50% by mass of h-BN, a composition point with 20% by mass of PTFE, 40% by mass of FEP, and 40% by mass of h-BN, a composition point with 38% by mass of PTFE, 22% by mass of FEP, and 40% by mass of h-BN, and a composition point with 35% by mass of PTFE, 15% by mass of FEP, and 50% by mass of h-BN.

Furthermore, in the case of the other spherical annular seal member in accordance with the present invention, the lubricating composition may contain hydrated alumina, and the heat-resistant material may contain at least one of a phosphate and phosphorus pentoxide.

Advantages of the Invention

According to the present invention, it is possible to provide a spherical annular seal member which makes it possible to alleviate the self-excited vibration and eliminate the generation of abnormal noise and exhibits stable sealing characteristics in sliding with a mating member even when used at an ambient temperature exceeding the melting point (327° C.) of PTFE, as well as a method of manufacturing the same.

MODE FOR CARRYING OUT THE INVENTION

Figure 1:
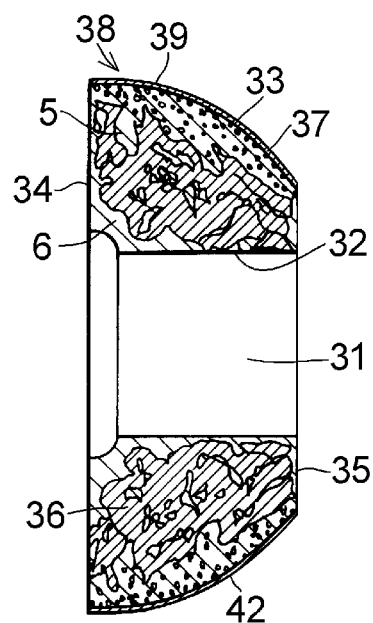
FIG. 1 is a vertical cross-sectional view of a spherical annular seal member which is manufactured in one embodiment of the present invention.

Next, a more detailed description will be given of the present invention and the mode for carrying it out on the basis of the preferred embodiments illustrated in the drawings. It should be noted that the present invention is not limited to these embodiments.

A description will be given of constituent materials of a spherical annular seal member and a method of manufacturing the spherical annular seal member in accordance with the invention.

<Concerning Heat-Resistant Material I and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., a natural flake graphite powder having a particle size of 30 to 80 meshes is added to the reaction solution, and reaction is allowed to take place for 30 minutes. After the reaction, the acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this is used as an acid-treated graphite powder.

The above-described acid-treated graphite powder is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet having a desired thickness. This expanded graphite sheet is used as a heat-resistant material I.

<Concerning Heat-Resistant Material II and Manufacturing Method Thereof>

While an acid-treated graphite powder obtained in a method similar to that of the above-described acid-treated graphite powder is being agitated, a solution in which an aqueous solution of aluminum primary phosphate [Al(H$_2$PO$_4$)$_3$] of a 50% concentration as a phosphate is diluted with methanol is compounded with that acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated. These expanded graphite particles are fed to the twin roller apparatus adjusted to a desired roll nip and is subjected to roll forming, thereby fabricating an expanded graphite sheet having a desired thickness. This expanded graphite sheet is used as a heat-resistant material II.

In the heat-resistant material II thus fabricated, aluminum primary phosphate is contained in the expanded graphite at a ratio of 0.1 to 16% by mass. This expanded graphite containing the phosphate permits use at, for instance, 600° C. or a high-temperature range exceeding 600° C. since the heat resistance of the expanded graphite itself is improved and the oxidation inhibiting action is imparted thereto. As the phosphate, it is possible to use, in addition to the aforementioned aluminum primary phosphate, lithium secondary phosphate (Li$_2$HPO$_4$), calcium primary phosphate [Ca(H$_2$PO$_4$)$_2$], calcium secondary phosphate (CaHPO$_4$), and aluminum secondary phosphate [Al$_2$(HPO$_4$)$_3$].

<Concerning Heat-Resistant Material III and Manufacturing Method Thereof>

While an acid-treated graphite powder obtained in a method similar to that of the above-described acid-treated graphite powder is being agitated, a solution in which an aqueous solution of aluminum primary phosphate of a 50% concentration as a phosphate and an aqueous solution of orthophosphoric acid (H$_3$PO$_4$) of a 84% concentration as a phosphoric acid are diluted with methanol is compounded with that acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated, and the orthophosphoric acid undergoes dehydration reaction to produce phosphorus pentoxide. These expanded graphite particles are fed to the twin roller apparatus adjusted to a desired roll nip and is subjected to roll forming, thereby fabricating an expanded graphite sheet having a desired thickness. This expanded graphite sheet is used as a heat-resistant material III.

In the heat-resistant material III thus fabricated, aluminum primary phosphate and phosphorus pentoxide are contained in the expanded graphite at a ratio of 0.1 to 16% by mass and at a ratio of 0.05 to 5% by mass, respectively. This expanded graphite containing the phosphate and phosphorus pentoxide permits use at, for instance, 600° C. or a high-temperature range exceeding 600° C. since the heat resistance of the expanded graphite itself is improved and the oxidation inhibiting action is imparted thereto. As the phosphoric acid, it is possible to use, in addition to the aforementioned orthophosphoric acid, metaphosphoric acid (HPO$_3$), polyphosphoric acid, and the like.

As the heat-resistant material, a sheet material having a density of 1.0 to 1.15 Mg/m$^3$ or thereabouts and a thickness of 0.3 to 0.6 mm or thereabouts is preferably used.

<Concerning Reinforcing Member>

As a reinforcing member, a woven or knitted metal wire net is used which is formed by weaving or knitting one or more fine metal wires including, as an iron-based wire, a stainless steel wire made of such as austenitic stainless steels SUS 304, SUS 310, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 5:
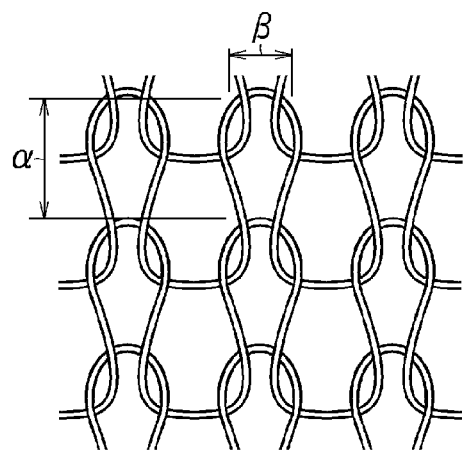
FIG. 5 is a plan view illustrating meshes of a metal wire net of the reinforcing member.

As for the metal wire net, a fine metal wire whose diameter is in a range of 0.05 to 0.32 mm, specifically a fine metal wire whose diameter is 0.05 mm, 0.10 mm, 0.15 mm, 0.17 mm, 0.20 mm, 0.28 mm, or 0.32 mm, is preferably used. As for a spherical annular base member which is formed by the fine metal wire of that diameter, a metal wire net having a mesh size (see FIG. 5 illustrating the knitted metal wire net) whose vertical length α is 4 to 6 mm and whose horizontal length β is 3 to 5 mm or thereabouts is suitably used, whereas, as for the metal wire net for an outer layer, a metal wire net having a mesh size a mesh size (see FIG. 5) whose vertical length α is 2.5 to 3.5 mm and whose horizontal length β is 1.5 to 2.5 mm or thereabouts is suitably used.

<Concerning Solid Lubricant and Coating Layer>

Figure 20:
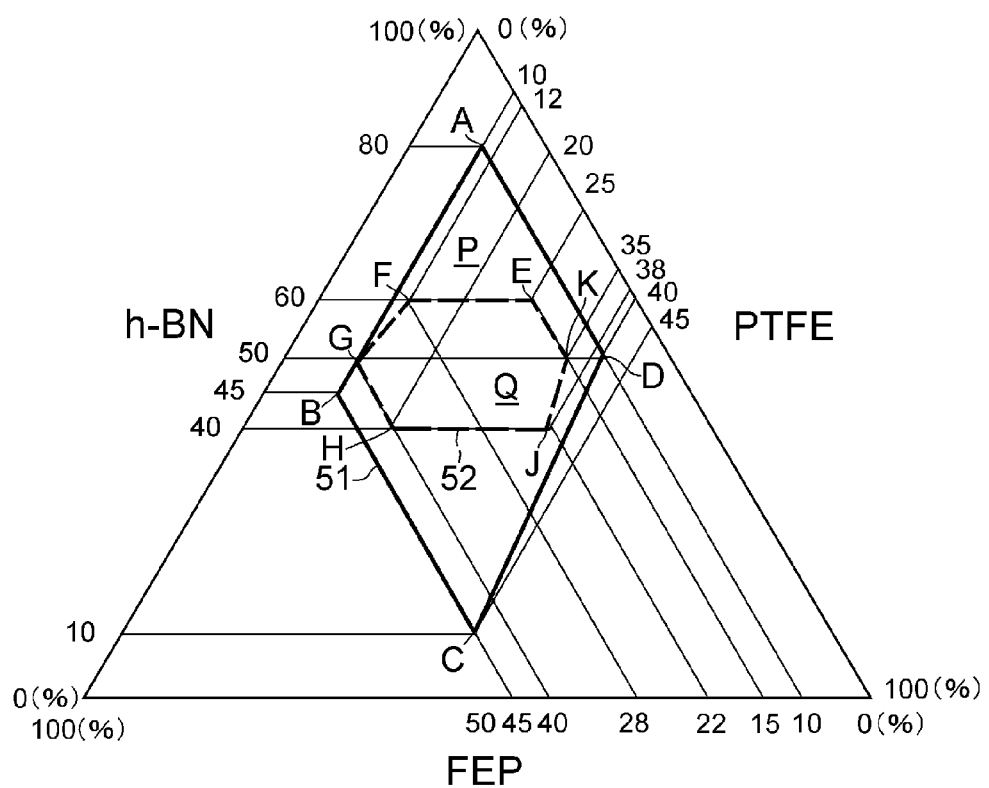
FIG. 20 is a ternary composition diagram concerning the composition ratio of a lubricating composition in accordance with the present invention.

In a ternary composition diagram of a triangle (equilateral triangle in this embodiment) concerning the composition ratio (% by mass) of PTFE, FEP, and h-BN, which is shown in FIG. 20 and in which the right oblique side in the plane of the drawing represents the content (% by mass) of PTFE, the base represents the content (% by mass) of FEP, and the left oblique side in the plane of the drawing represents the content (% by mass) of h-BN, the composition ratio of the lubricating composition containing PTFE, FEP, and h-BN preferably falls within a numerical range corresponding to an interior region P bounded by a quadrangle 51 having as vertices a composition point A with 10% by mass of PTFE, 10% by mass of FEP, and 80% by mass of h-BN, a composition point B with 10% by mass of PTFE, 45% by mass of FEP, and 45% by mass of h-BN, a composition point C with 45% by mass of PTFE, 45% by mass of FEP, and 10% by mass of h-BN, and a composition point D with 40% by mass of PTFE, 10% by mass of FEP, and 50% by mass of h-BN. More preferably, in the ternary composition diagram shown in FIG. 20, the composition ratio of the lubricating composition containing PTFE, FEP, and h-BN preferably falls within a numerical range corresponding to an interior region Q bounded by a hexagon 52 having as vertices a composition point E with 25% by mass of PTFE, 15% by mass of FEP, and 60% by mass of h-BN, a composition point F with 12% by mass of PTFE, 28% by mass of FEP, and 60% by mass of h-BN, a composition point G with 10% by mass of PTFE, 40% by mass of FEP, and 50% by mass of h-BN, a composition point H with 20% by mass of PTFE, 40% by mass of FEP, and 40% by mass of h-BN, a composition point J with 38% by mass of PTFE, 22% by mass of FEP, and 40% by mass of h-BN, and a composition point K with 35% by mass of PTFE, 15% by mass of FEP, and 50% by mass of h-BN.

In the manufacturing process, this lubricating composition serving as a solid lubricant is used in the form of an aqueous dispersion which is composed of a PTFE powder with an average particle size of 0.01 to 1 µm, an FEP powder with an average particle size of 0.01 to 1 µm, an h-BN powder with an average particle size of 0.1 to 20 µm, a surfactant, and water.

In the aqueous dispersion, the content ratio of the PTFE powder, the FEP powder, and the h-BN powder, which exhibits excellent lubricity particularly in a high-temperature range, falls within a numerical range corresponding to the interior region bounded by the quadrangle 51 in the ternary composition diagram shown in FIG. 20, preferably within a numerical range corresponding to the interior region bounded by the hexagon 52 in the ternary composition diagram; more preferably, the PTFE powder is 25% by mass, the FEP powder is 25% by mass, and the h-BN powder is 50% by mass.

An aqueous dispersion is used in which 39% by mass of the lubricating composition powder containing the PTFE powder, the FEP powder, and the h-BN powder which are constituted by such a content ratio is mixed with, for example, 4% by mass of a surfactant and 57% by mass of water. However, the water content in the aqueous dispersion may be increased or decreased in correspondence with the form of application of the aqueous dispersion to the expanded graphite sheet by such means as roller coating, brushing, spraying, or the like.

The surfactant contained in the aqueous dispersion suffices if it is capable of allowing the lubricating composition powder to be uniformly dispersed in water, and it is possible to use any one of an anionic surfactant, a cationic surfactant, a nonionic surfactant, and an amphoteric surfactant. It is possible to cite, for example, anionic surfactants such as sodium alkyl sulfate, sodium alkyl ether sulfate, triethanol amine alkyl sulfate, triethanol amine alkyl ether sulfate, ammonium alkyl sulfate, ammonium alkyl ether sulfate, alkyl ether sodium phosphate, and sodium fluoroalkyl carboxylate; cationic surfactants such as alkyl ammonium salt and alkyl benzyl ammonium salt; nonionic surfactants such as polyoxyethylene alkyl ether, polyoxyethylene phenyl ether, polyoxyethylene alkyl ester, propylene glycol-propylene oxide copolymer, perfluoroalkyl ethylene oxide additive, and 2-ethyl-hexanol ethylene oxide additive; and amphoteric surfactants such as alkylaminoacetic acid betaine, alkylamidoacetic acid betaine, and imidazolium betaine. In particular, anionic and nonionic surfactants are preferable. Particularly preferable surfactants are nonionic surfactants having an oxyethylene chain in which the amount of pyrolytic residue is small.

In the aqueous dispersion, the content of the surfactant is, for example, 4% by mass with respect to 39% by mass of the lubricating composition powder; however, if the content of the surfactant is excessively small, the dispersion of the lubricating composition powder does not become uniform, whereas if the content of the surfactant is excessively large, the pyrolytic residue of the surfactant due to sintering becomes large and coloration takes place, additionally resulting in a decline in the heat resistance, nonadhesiveness, and the like of the coating layer.

The aqueous dispersion containing the PTFE powder, the FEP powder, the h-BN powder, the surfactant, and water may further contain a hydrated alumina powder at a ratio of not more than 20% by mass in substitution of part of the content of the h-BN powder in the lubricating composition powder.

An aqueous organic solvent may be further contained in the aqueous dispersion containing the PTFE powder, the FEP powder, the h-BN powder, the surfactant, and water or the aqueous dispersion containing the PTFE powder, the FEP powder, the h-BN powder, the hydrated alumina powder, the surfactant, and water. As the aqueous organic solvent, it is possible to cite, for example, alcohol-based solvents such as methanol, ethanol, butanol, isopropyl alcohol, and glycerin; ketone-based solvents such as acetone, methylethyl ketone, and methylisobutyl ketone; ether-based solvents such as methyl cellosolve, cellosolve, and butyl cellosolve; glycol-based solvents such as ethylene glycol, propylene glycol, triethylene glycol, and tetraethylene glycol; amide-based solvents such as dimethylformamide and dimethylacetamide; and lactam-based solvents such as N-methyl-2-pyrrolidone. The content of the aqueous organic solvent is 0.5 to 50% by weight, preferably 1 to 30% by weight, of the total amount of water. The aqueous organic solvent has the function of wetting the PTFE powder and the FEP powder and forms a uniform mixture with the h-BN powder, and since it evaporates during drying, it does not adversely affect the coating layer.

As the aqueous dispersion of the above-described lubricating composition powder, any one of the following aqueous dispersions is used:

(1) an aqueous dispersion composed of 39% by mass of a lubricating composition powder which is composed of the PTFE powder with an average particle size of 0.01 to 1 µm, the FEP powder with an average particle size of 0.01 to 1

μm, and the h-BN powder with an average particle size of 0.1 to 20 μm and which has a composition ratio falling within a numerical range corresponding to the interior region P bounded by the quadrangle 51 in the ternary composition diagram shown in FIG. 20, as well as 4% by mass of a surfactant and 57% by mass of water;

(2) an aqueous dispersion composed of 39% by mass of the lubricating composition powder of (1) which has the composition ratio of (1) and in which after securing 45% by mass or more of the h-BN powder content, 20% by mass or less of a hydrated alumina powder is contained in substitution of part of the content of that h-BN powder, as well as 4% by mass of a surfactant and 57% by mass of water;

(3) an aqueous dispersion in which 0.1 to 22.5% by mass of an aqueous organic solvent is further contained in the aqueous dispersion in (1) above; and (4) an aqueous dispersion in which 0.1 to 22.5% by mass of an aqueous organic solvent is further contained in the aqueous dispersion in (2) above.

The aqueous dispersion is applied to one surface of the expanded graphite sheet by means of roller coating, brushing, spraying, or the like, and after this aqueous dispersion is dried, a coating layer of a solid lubricant consisting of the lubricating composition is formed on the one surface of that expanded graphite sheet. After the drying, the coating layer of the solid lubricant may be sintered in a heating furnace for 10 to 30 minutes at a temperature within a range of (T) to (T+150° C.), preferably (T+5° C.) to (T+135° C.), more preferably (T+10° C.) to (T+125° C.), with respect to the melting point T (=245° C.) of FEP. By the sintering of the coating layer of this solid lubricant, a sintered coating layer of the solid lubricant is formed on the one surface of the expanded graphite sheet.

Next, referring to the drawings, a description will be given of a method of manufacturing a spherical annular seal member composed of the above-described constituent materials.

Figure 3:
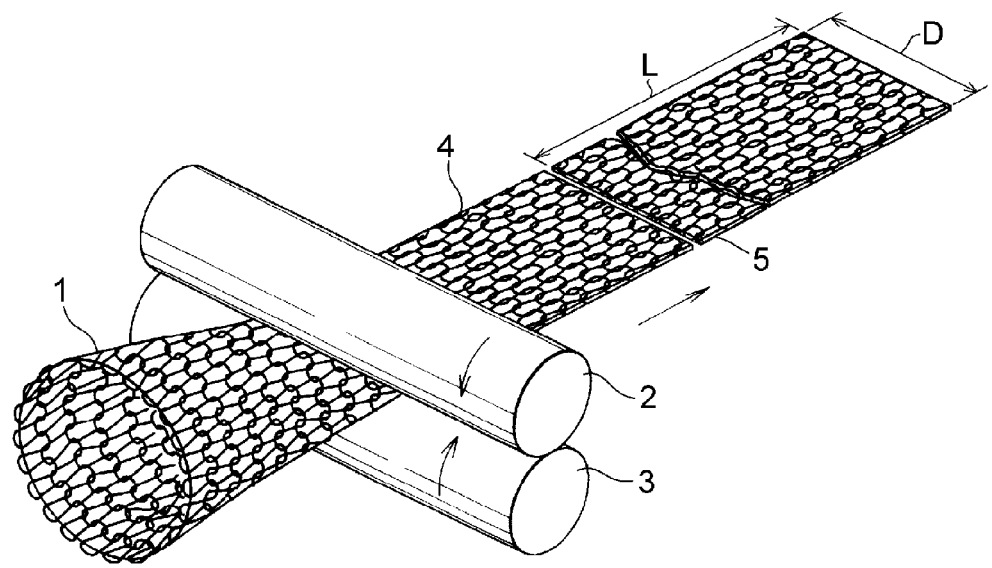
FIG. 3 is a view explaining a method of forming a reinforcing member in a process of manufacturing the spherical annular seal member in accordance with the present invention.

(First Process) As shown in FIG. 3, a hollow cylindrical knitted metal wire net 1, which is formed by knitting a metal wire net with a wire diameter of 0.05 to 0.32 mm into a cylindrical shape and which has a mesh size with the vertical length α of 4 to 6 mm and the horizontal length β of 3 to 5 mm or thereabouts (see FIG. 5), is passed between rollers 2 and 3, thereby fabricating a belt-shaped metal wire net 4 having a predetermined width D. A strip-shaped metal wire net 5 serving as a reinforcing member is then prepared by cutting the belt-shaped metal wire net 4 into a predetermined length L.

Figure 4:
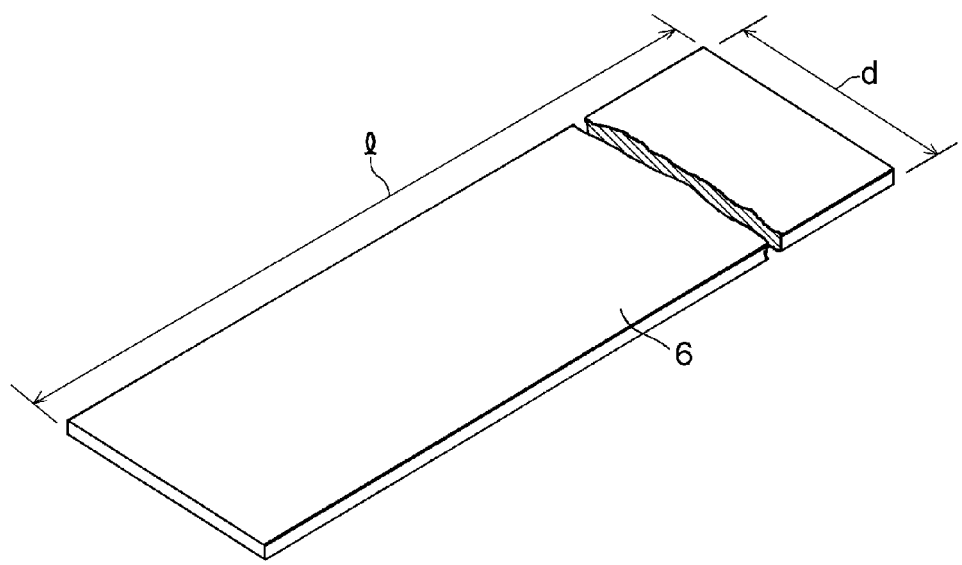
FIG. 4 is a perspective view of a heat-resistant material in the process of manufacturing the spherical annular seal member in accordance with the present invention.

(Second Process) As shown in FIG. 4, an expanded graphite sheet 6 (composed of one of the heat-resistant material I, the heat-resistant material II, and the heat-resistant material III) for the spherical annular base member is prepared whose density is 1.0 to 1.5 Mg/m$^3$, preferably 1.0 to 1.2 Mg/m$^3$, so as to have a width d of from (1.10×D) mm to (2.10×D) mm with respect to the width D of the metal wire net 5 and a length 1 of (1.30×L) mm to (2.70×L) mm with respect to the length L of the metal wire net 5.

Figure 6:
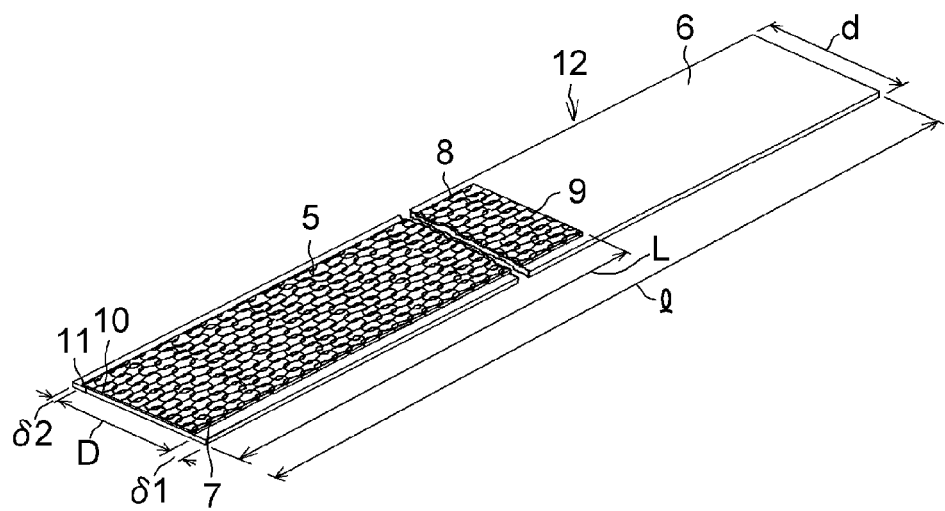
FIG. 6 is a perspective view of a superposed assembly in the process of manufacturing the spherical annular seal member in accordance with the present invention.

(Third Process) A superposed assembly 12 in which the expanded graphite sheet 6 and the metal wire net 5 are superposed one on top of the other is prepared as follows: To ensure that the heat-resistant material made from the strip-shaped expanded graphite sheet 6 is wholly exposed on a large-diameter side annular end face 34 of a partially convex spherical surface 33 in a spherical annular seal member 38 (see FIG. 1), as shown in FIG. 6, the expanded graphite sheet 6 is made to project in the widthwise direction by a maximum of (0.10 to 0.80)×D mm from one widthwise end 7 of the metal wire net 5, which serves as the large-diameter side annular end face 34 of the partially convex spherical surface 33. Also, the amount of widthwise projection, δ1, of the expanded graphite sheet 6 from the end 7 is made greater than the amount of its widthwise projection, δ2, from the other widthwise end 8 of the metal wire net 5, which serves as a small-diameter side annular end face 35 of the partially convex spherical surface 33. Further, the expanded graphite sheet 6 is made to project in the longitudinal direction by a maximum of (0.30 to 1.70)×L mm from one longitudinal end 9 of the metal wire net 5, while the other longitudinal end 10 of the metal wire net 5 and a longitudinal end 11 of the expanded graphite sheet 6 corresponding to that end 10 are made to coincide with each other.

Figure 7:
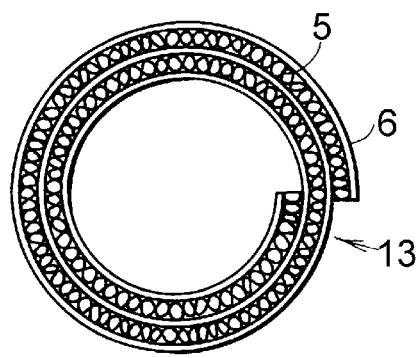
FIG. 7 is a plan view of a tubular base member in the process of manufacturing the spherical annular seal member in accordance with the present invention.
Figure 8:
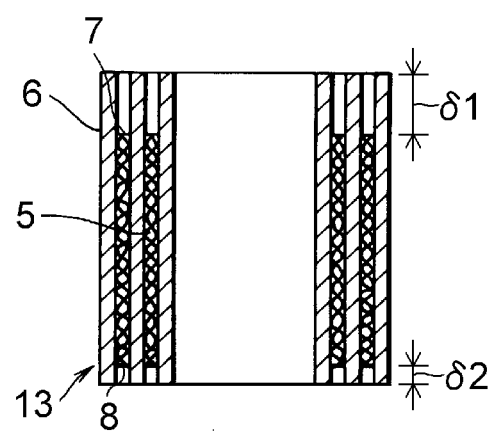
FIG. 8 is a vertical cross-sectional view of the tubular base member shown in FIG. 7.

(Fourth Process) As shown in FIG. 7, the superposed assembly 12 is convoluted with the expanded graphite sheet 6 placed on the inner side such that the expanded graphite sheet 6 is convoluted with one more turn, thereby forming a tubular base member 13 in which the expanded graphite sheet 6 is exposed on both the inner peripheral side and the outer peripheral side. As the expanded graphite sheet 6, one is prepared in advance which has a length 1 of from (1.30×L) mm to (2.70×L) mm with respect to the length L of the metal wire net 5 so that the number of winding turns of the expanded graphite sheet 6 in the tubular base member 13 becomes greater than the number of winding turns of the metal wire net 5. In the tubular base member 13, as shown in FIG. 8, the expanded graphite sheet 6 on its one widthwise end side projects in the widthwise direction by δ1 from the one end 7 of the metal wire net 5, and the expanded graphite sheet 6 on its other widthwise end side projects in the widthwise direction by δ2 from the other end 8 of the metal wire net 5.

Figure 9:
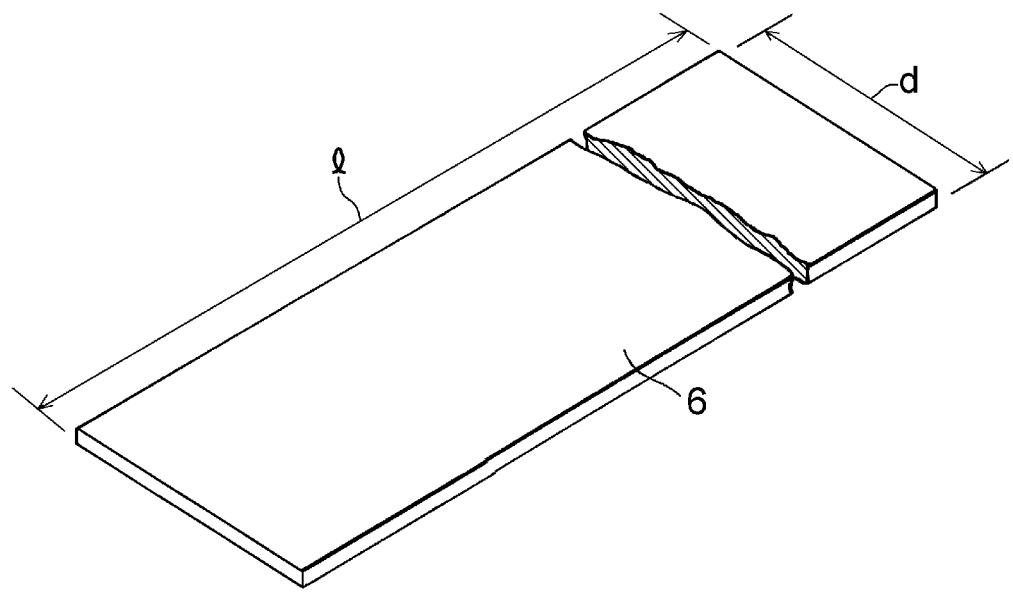
FIG. 9 is a perspective view of the heat-resistant material in the process of manufacturing the spherical annular seal member in accordance with the present invention.

(Fifth Process) Another strip-shaped expanded graphite sheet 6, such as the one shown in FIG. 9, is separately prepared which is similar to the expanded graphite sheet 6 but has a smaller width d than the width D of the metal wire net 5 and has a length 1 of such a measure as to be able to be wound around the tubular base member 13 by one turn.

(Sixth Process) As the aqueous dispersion, any one of the following aqueous dispersions is prepared:

(1) an aqueous dispersion composed of 39% by mass of a lubricating composition powder which is composed of the PTFE powder with an average particle size of 0.01 to 1 μm, the FEP powder with an average particle size of 0.01 to 1 μm, and the h-BN powder with an average particle size of 0.1 to 20 μm and which has a composition ratio falling within a numerical range corresponding to the interior region P bounded by the quadrangle 51 in the ternary composition diagram shown in FIG. 20, as well as 4% by mass of a surfactant and 57% by mass of water;

(2) an aqueous dispersion composed of 39% by mass of the lubricating composition powder of (1) which has the composition ratio of (1) and in which after securing 45% by mass or more of the h-BN powder content, 20% by mass or less of a hydrated alumina powder is contained in substitution of part of the content of that h-BN powder, as well as 4% by mass of a surfactant and 57% by mass of water;

(3) an aqueous dispersion in which 0.1 to 22.5% by mass of an aqueous organic solvent is further contained in the aqueous dispersion in (1) above; and (4) an aqueous dispersion in which 0.1 to 22.5% by mass of an aqueous organic solvent is further contained in the aqueous dispersion in (2) above.

Figure 10:
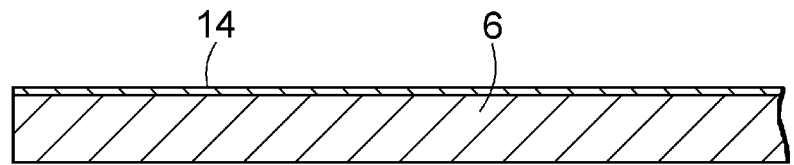
FIG. 10 is a cross-sectional view of the heat-resistant material having a coating layer of a solid lubricant in the process of manufacturing the spherical annular seal member in accordance with the present invention.

(Seventh Process) One of the aqueous dispersions (1) to (4) is applied to one surface of the expanded graphite sheet 6 shown in FIG. 9 by means of brushing, roller coating, spraying, or the like, and this coating layer is dried at a temperature of 100° C., thereby forming a coating layer 14 of the solid lubricant composed of the lubricating composition, as shown in FIG. 10.

(Eighth Process)

Figure 11:
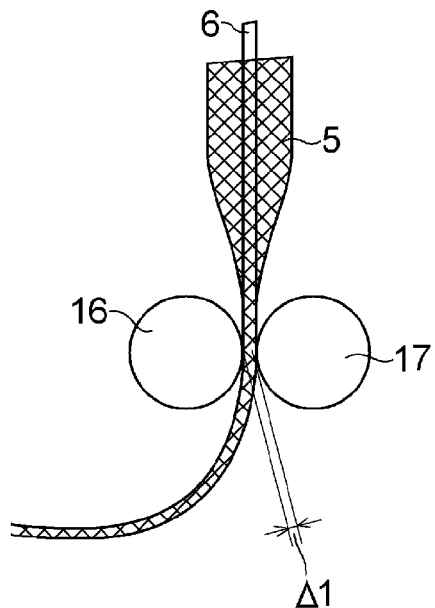
FIG. 11 is a view explaining a first method of forming an outer-layer forming member in the process of manufacturing the spherical annular seal member in accordance with the present invention.
Figure 12:
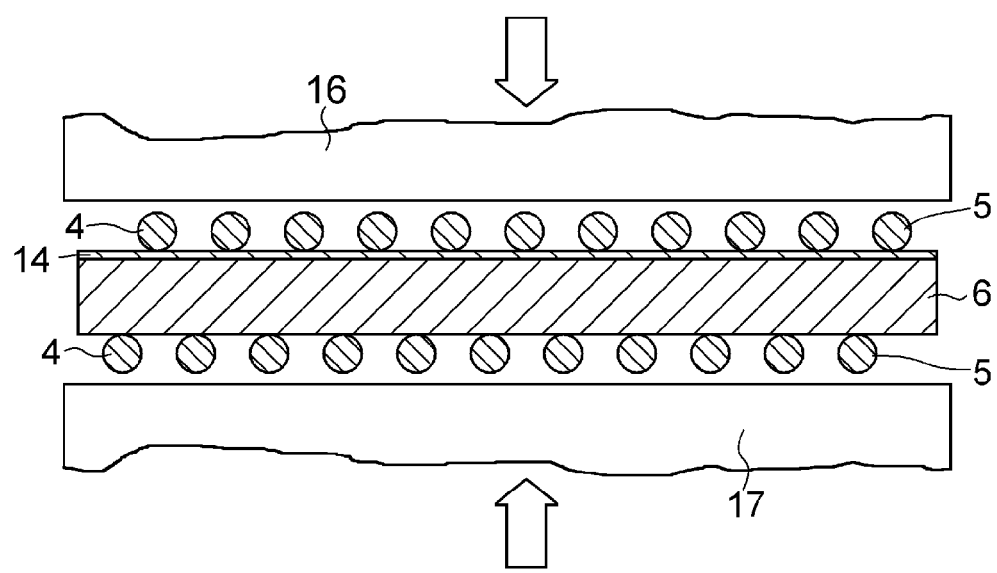
FIG. 12 is a view explaining the first method of forming the outer-layer forming member in the process of manufacturing the spherical annular seal member in accordance with the present invention.
Figure 13:
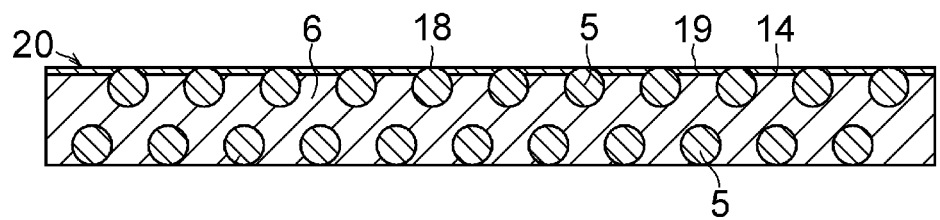
FIG. 13 is a vertical cross-sectional view of the outer-layer forming member which is obtained by the first forming method in the process of manufacturing the spherical annular seal member in accordance with the present invention.

<First Method> As shown in FIGS. 11 to 13, the expanded graphite sheet 6 having the coating layer 14 of the solid lubricant is continuously inserted (see FIG. 11) into the metal wire net 5 for the outer layer constituted by the hollow cylindrical knitted metal wire net 1 obtained by continuously knitting a fine metal wire with a wire diameter of 0.05 to 0.32 mm by a knitting machine (not shown). The metal wire net 5 with the expanded graphite sheet 6 inserted therein is fed, starting with its insertion start end side, into a nip Δ1 between a pair of cylindrical rollers 16 and 17 each having a smooth cylindrical outer peripheral surface, so as to be integrated by being pressurized in the thicknesswise direction of the expanded graphite sheet 6 (see FIG. 12), thereby filling the meshes of the metal wire net 5 for the outer layer with the expanded graphite sheet 6 and the coating layer 14 of the solid lubricant formed on the surface of that expanded graphite sheet 6. Thus, a flattened outer-layer forming member 20 is fabricated on the surface of which areas 18 constituted by the metal wire net 5 for the outer layer and areas 19 constituted by the solid lubricant are exposed in mixed form.

Figure 14:
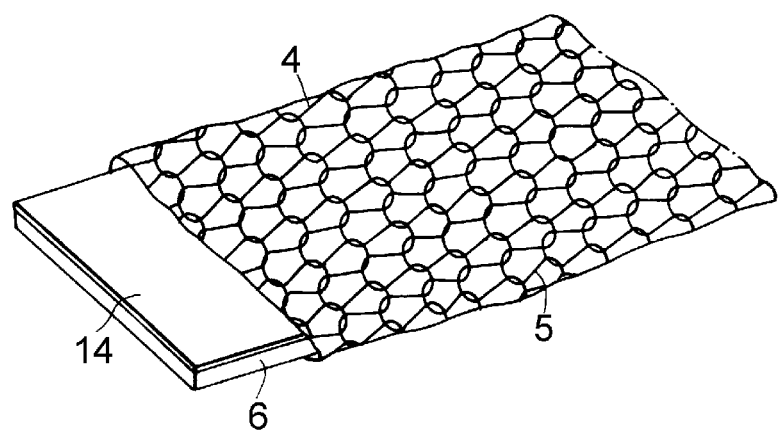
FIG. 14 is a view explaining a second method of forming the outer-layer forming member in the process of manufacturing the spherical annular seal member in accordance with the present invention.
Figure 15:
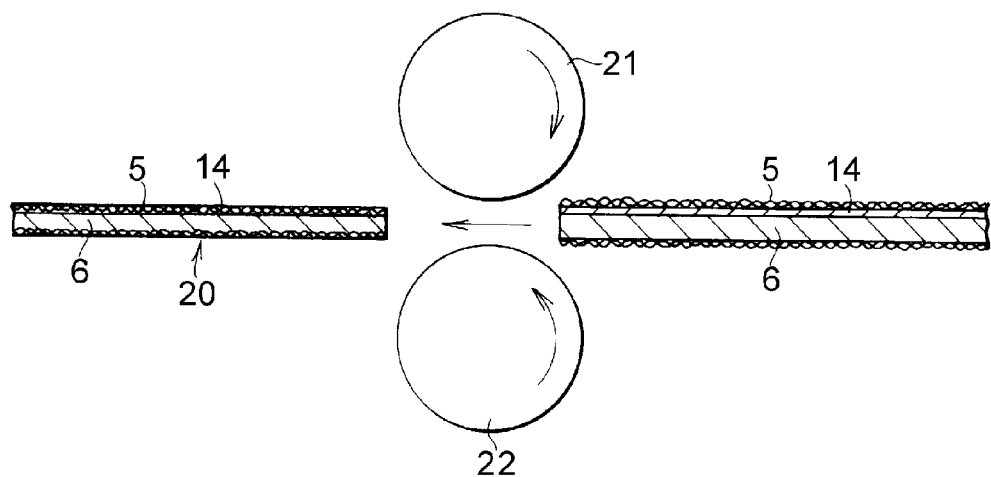
FIG. 15 is a view explaining the second method of forming the outer-layer forming member in the process of manufacturing the spherical annular seal member in accordance with the present invention.

<Second Method> The metal wire net 5 constituted by the belt-shaped metal wire net 4 described in the above-described first process is separately prepared, and, as shown in FIG. 14, the expanded graphite sheet 6 having the coating layer 14 of the solid lubricant is inserted into the metal wire net 5 for the outer layer constituted by the belt-shaped metal wire net 4, and, as shown in FIG. 15, this assembly is fed into a nip Δ1 between cylindrical rollers 21 and 22 so as to be integrated by being pressurized in the thicknesswise direction of the expanded graphite sheet 6, thereby filling the meshes of the metal wire net 5 for the outer layer with the expanded graphite sheet 6 and the coating layer 14 of the solid lubricant formed on the surface of that expanded graphite sheet 6. Thus, the flattened outer-layer forming member 20 is fabricated on the surface of which the areas 18 constituted by the metal wire net 5 for the outer layer and the areas 19 constituted by the solid lubricant are exposed in mixed form.

<Third Method (Not Shown)> A plain woven metal wire net is prepared as a woven metal wire net which is formed by weaving a fine metal wire with a diameter of 0.05 to 0.32 mm. By cutting the metal wire net 5 for the outer layer, made from this plain woven metal wire, to a predetermined length and width, two strip-shaped metal wire nets 5 are prepared. The expanded graphite sheet 6 having the coating layer 14 of the solid lubricant is inserted between the two metal wire nets 5 for the outer layer, and this assembly is fed into the nip Δ1 between the pair of cylindrical rollers 21 and 22 so as to be integrated by being pressurized in the thicknesswise direction of the expanded graphite sheet 6, thereby filling the meshes of the metal wire net 5 for the outer layer with the expanded graphite sheet 6 and the coating layer 14 of the solid lubricant formed on the surface of that expanded graphite sheet 6. Thus, the flattened outer-layer forming member 20 is fabricated on the surface of which the areas 18 constituted by the metal wire net 5 for the outer layer and the areas 19 constituted by the solid lubricant are exposed in mixed form.

<Fourth Method (Not Shown)> Two metal wire nets 5 similar to the strip-shaped metal wire net 5 in the third method or the strip-shaped metal wire net 5 shown in FIG. 3 is prepared. This metal wire net 5 for the outer layer is superposed on that surface (reverse surface) of the expanded graphite sheet 6 that is opposite to its surface having the costing layer 14 of the solid lubricant, and this superposed assembly of the metal wire net 5 and the expanded graphite sheet 6 having the costing layer 14 of the solid lubricant is fed into the nip Δ1 between the pair of cylindrical rollers 21 and 22 so as to be integrated by being pressurized in the thicknesswise direction of the expanded graphite sheet 6, thereby filling the meshes of the metal wire net 5 for the outer layer with the expanded graphite sheet 6. Thus, the flattened outer-layer forming member 20 is fabricated on the surface of which only the area 19 of the solid lubricant (only the costing layer 14) is exposed.

In the first to fourth methods, 0.4 to 0.6 mm or thereabouts is suitable as the nip Δ1 between the pair of cylindrical rollers 16 and 17 and the cylindrical rollers 21 and 22.

Figure 16:
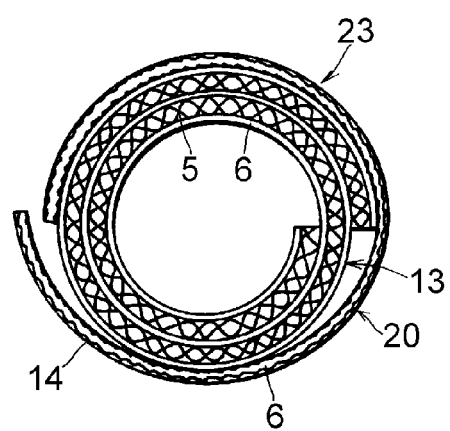
FIG. 16 is a plan view of a cylindrical preform in the process of manufacturing the spherical annular seal member in accordance with the present invention.

(Ninth Process) The outer-layer forming member 20 thus obtained is wound around an outer peripheral surface of the tubular base member 13 with its coating layer 14 placed on the outer side, thereby preparing a cylindrical preform 23 (see FIG. 16).

Figure 17:
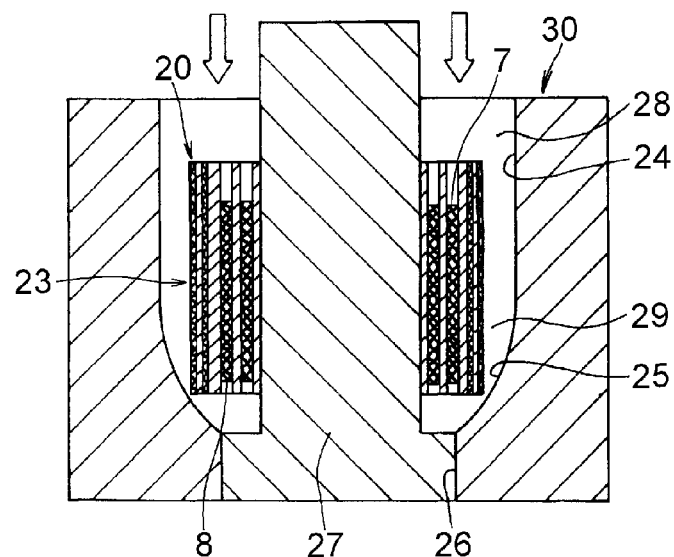
FIG. 17 is a cross-sectional view illustrating a state in which the cylindrical preform is inserted in a die in the process of manufacturing the spherical annular seal member in accordance with the present invention.

(10th Process) A die 30 such as the one shown in FIG. 17 is prepared which has on its inner surface a cylindrical wall surface 24, a partially concave spherical wall surface 25 continuing from the cylindrical wall surface 24, and a through hole 26 continuing from the partially concave spherical wall surface 25, and in which a hollow cylindrical portion 28 and a spherical annular hollow portion 29 continuing from the hollow cylindrical portion 28 are formed inside it as a stepped core 27 is fittingly inserted in the through hole 26. Then, the cylindrical preform 23 is fitted over the stepped core 27 of the die 30.

Figure 2:
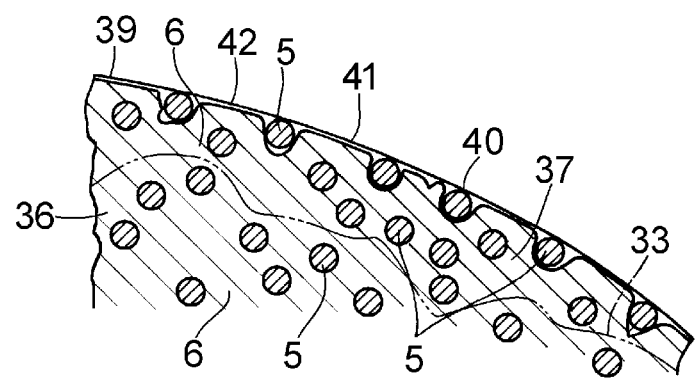
FIG. 2 is a partially enlarged explanatory view of the spherical annular seal member shown in FIG. 1.

The cylindrical preform 23 disposed in the hollow cylindrical portion 28 and the spherical annular hollow portion 29 of the die 30 is subjected to compression forming under a pressure of 98 to 294 N/mm² (1 to 3 tons/cm²) in the direction of the core axis. Thus, the spherical annular seal member 38 is fabricated which includes a spherical annular base member 36 having a through hole 31 in its central portion and defined by a cylindrical inner surface 32, the partially convex spherical surface 33, and large- and small-diameter side annular end faces 34 and 35 of the partially convex spherical surface 33, as well as an outer layer 37 formed integrally on the partially convex spherical surface 33 of the spherical annular base member 36, as shown in FIGS. 1 and 2.

By means of this compression forming, the spherical annular base member 36 is constructed so as to be provided with structural integrity as the expanded graphite sheet 6 and the metal wire net 5 are compressed and intertwined with each other. In the outer layer 37, the expanded graphite sheet 6, the solid lubricant consisting of the lubricating composition, and the metal wire net 5 are compressed such that the solid lubricant and the expanded graphite sheet 6 are filled in the meshes of the metal wire net 5, and the solid lubricant, the expanded graphite sheet 6, and the metal wire net 5 are integrated in mixed form, an outer surface 39 of that outer layer 37 being thus formed into a smooth surface 42 in which areas 40 of the reinforcing member constituted by the metal wire net 5 and areas 41 constituted by the solid lubricant are present in mixed form or into a smooth surface 42 constituted by the area 41 of the solid lubricant covering the reinforcing member.

In the spherical annular base member 36 and the outer layer 37 of the fabricated spherical annular seal member 38, the reinforcing member constituted by the metal wire net 5 is contained at a ratio of 40 to 65% by mass, and the heat-resistant material constituted by the expanded graphite sheet 6 containing expanded graphite and the solid lubricant are contained at a ratio of 35 to 60% by mass. The heat-resistant material constituted by the expanded graphite sheet 6 and the solid lubricant in the spherical annular base member 36 and the outer layer 37 have a density of 1.20 to 2.00 Mg/m$^3$.

In addition, in the outer layer 37, the reinforcing member constituted by the metal wire net 5 is contained at a ratio of 60 to 75% by mass, and the heat-resistant material constituted by the expanded graphite sheet 6 containing expanded graphite and the solid lubricant are contained at a ratio of 25 to 40% by mass.

In the fourth process, if the tubular base member 13 is formed by convoluting the superposed assembly 12 in a state in which the metal wire net 5 constituted by the belt-shaped metal wire net 4 is placed on the inner side, instead of convoluting the superposed assembly 12 with the expanded graphite sheet 6 placed on the inner side, it is possible to fabricate the spherical annular seal member 38 in which the reinforcing member constituted by the metal wire net 5 is exposed on the cylindrical inner surface 32 of the spherical annular base member 36.

Figure 18:
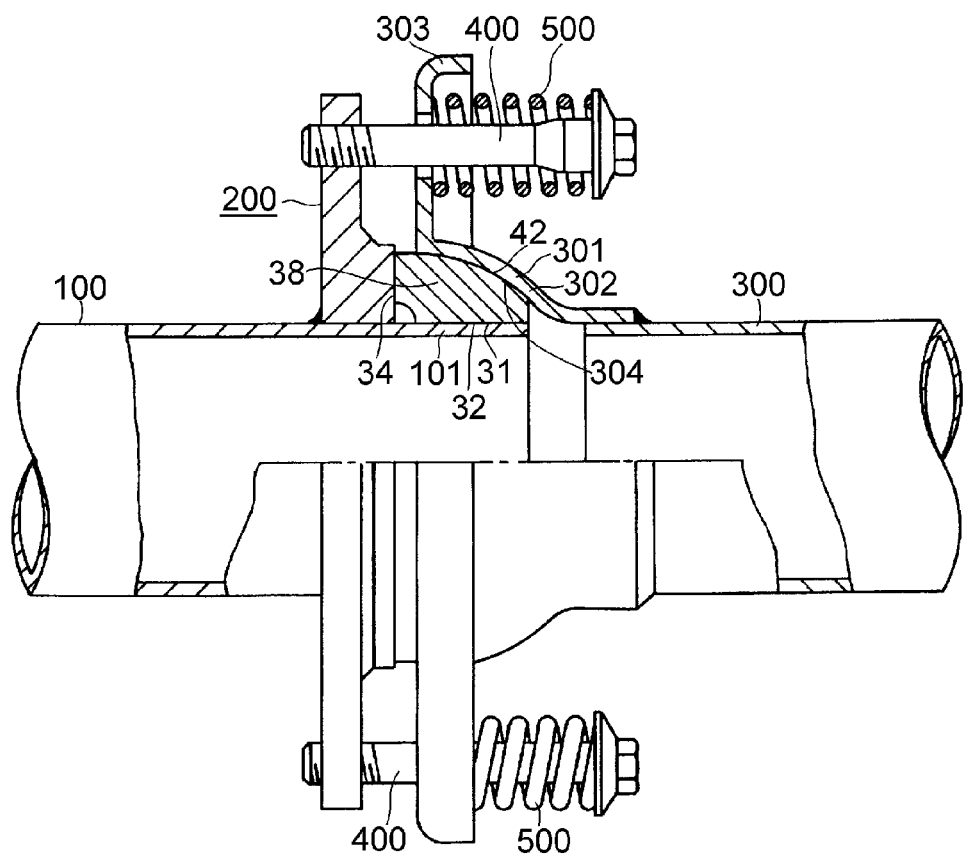
FIG. 18 is a vertical cross-sectional view of an exhaust pipe joint incorporating the spherical annular seal member in accordance with the present invention.
Figure 19:
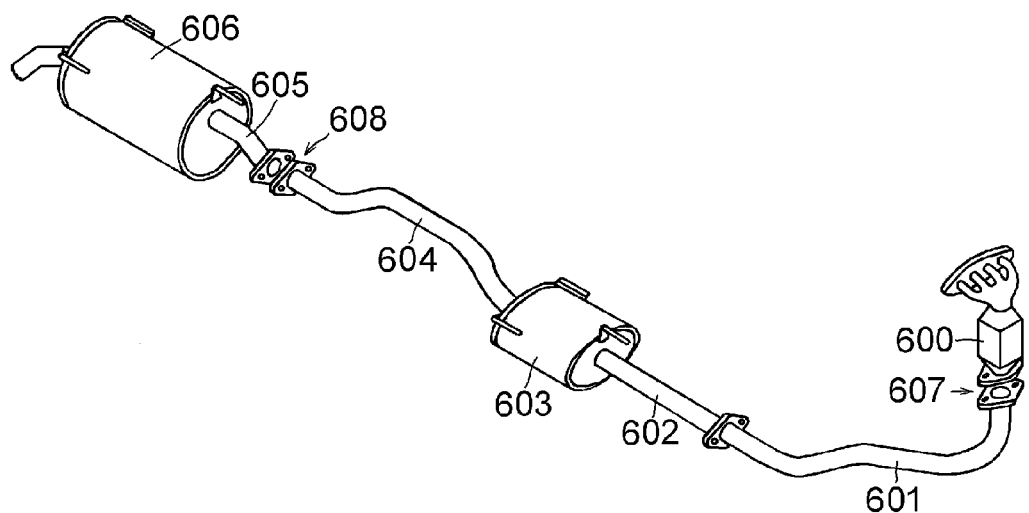
FIG. 19 is an explanatory view of an exhaust system of an engine.

In the exhaust pipe spherical joint which is shown in FIG. 18 and used by incorporating the spherical annular seal member 38, a flange 200 is provided uprightly on an outer peripheral surface of an upstream-side exhaust pipe 100, which is connected to the engine side, by leaving a pipe end portion 101. The spherical annular seal member 38 is fitted over the pipe end portion 101 at the cylindrical inner surface 32 defining the through hole 31, and the spherical annular seal member 38 at its large-diameter side annular end face 34 is brought into contact with and seated on the flange 200. A flared portion 301, which integrally has a concave spherical surface portion 302 and a flange portion 303 continuous from the concave spherical surface portion 302, is secured to a downstream-side exhaust pipe 300 disposed in such a manner as to oppose the upstream-side exhaust pipe 100 and is connected to the muffler side. An inner surface 304 of the concave spherical surface portion 302 is in sliding contact with the smooth surface 42 in the outer surface 39 of the outer layer 37 of the spherical annular seal member 38.

In the exhaust pipe spherical joint shown in FIG. 18, the downstream-side exhaust pipe 300 is constantly urged resiliently toward the upstream-side exhaust pipe 100 by means of a pair of bolts 400 each arranged with one end fixed to the flange 200 and another end inserted in the flange portion 303 of the flared portion 301, and by means of a pair of coil springs 500 each arranged between an enlarged head of the bolt 400 and the flange portion 303. Further, the exhaust pipe spherical joint is so adapted that relative angular displacements occurring in the upstream- and downstream-side exhaust pipes 100 and 300 are allowed by sliding contact between the smooth surface 42 serving as a sliding surface of the outer layer 37 of the spherical annular seal member 38 and the inner surface 304 of the concave spherical surface portion 302 of the flared portion 301 formed at the end of the downstream-side exhaust pipe 300.

EXAMPLES

Next, the present invention will be described in detail in accordance with examples. It should be noted that the present invention is not limited to these examples.

Example 1

By using one austenitic stainless steel wire (SUS 304) having a wire diameter of 0.28 mm as the fine metal wire, a cylindrical knitted metal wire net having a mesh size which was 4 mm in vertical length and 5 mm in horizontal length was fabricated and was passed between a pair of rollers to form a belt-shaped metal wire net. This metal wire net was used as the metal wire net serving as the reinforcing member for the spherical annular base member. As the heat-resistant material, an expanded graphite sheet (heat-resistant material I) having a density of 1.12 Mg/m$^3$ and a thickness of 0.38 mm was used. After the expanded graphite sheet was convoluted by a one-circumference portion, the metal wire net for the spherical annular base member was superposed on the inner side of the expanded graphite sheet, and the superposed assembly thereof was convoluted, thereby preparing a tubular base member in which the expanded graphite sheet was located on the outermost periphery. In this tubular base member, widthwise opposite end portions of the expanded graphite sheet respectively projected from the metal wire net for the spherical annular base member in the widthwise direction thereof By using one fine metal wire similar to the above-described one, a cylindrical knitted metal wire net having a mesh size which was 3.5 mm in vertical length and 1.5 mm in horizontal length was fabricated and was passed between the pair of rollers to form a belt-shaped metal wire net. This metal wire net was used as the metal wire net as the reinforcing member for the outer layer.

By using an expanded graphite sheet (heat-resistant material I) similar to the above-described one, an expanded graphite sheet having a smaller width than the width of the aforementioned metal wire net as the reinforcing member for the outer layer was prepared separately.

An aqueous dispersion (3.9% by mass of PTFE, 3.9% by mass of FEP, 31.2% by mass of h-BN, 4% by mass of a nonionic surfactant, and 57% by mass of water) was prepared which was composed of 39% by mass of a lubricating composition powder containing 10% by mass of a PTFE powder with an average particle size of 0.20 µm, 10% by mass of an FEP powder with an average particle size of 0.15 µm, and 80% by mass of an h-BN powder with an average particle size of 8 µm, 4% by mass of polyoxyenthelene alkyl ether (nonionic surfactant) as a surfactant, and 57% by mass of water.

This aqueous dispersion was roller coated on one surface of the aforementioned separately prepared expanded graphite sheet, was dried at a temperature of 100° C. to form a coating layer of the solid lubricant (10% by mass of PTFE, 10% by mass of FEP, and 80% by mass of h-BN) consisting of the lubricating composition of PTFE, FEP, and h-BN.

The expanded graphite sheet having the coating layer of the solid lubricant was inserted into the belt-shaped metal wire net which is the reinforcing member for the outer layer and was passed between the pair of rollers so as to be integrated, thereby filling the meshes of the metal wire net of the reinforcing member with the expanded graphite sheet and the coating layer of the solid lubricant on the surface of that expanded graphite sheet. Thus, a flattened outer-layer forming member was fabricated on the surface of which areas constituted by the metal wire net as the reinforcing member and areas constituted by the solid lubricant were exposed in mixed form.

The outer-layer forming member, in a state in which its surface where the areas constituted by the metal wire net and the areas constituted by the solid lubricant were exposed in mixed form on its obverse surface was placed on the outer side, was wound around the outer peripheral surface of the tubular base member, thereby preparing a cylindrical preform. This cylindrical preform was fitted over the stepped core of the die shown in FIG. 17, and was disposed in the hollow portion of the die.

The cylindrical preform disposed in the hollow portion of the die was subjected to compression molding at a pressure of 294 N/mm² (3 tons/cm²) in the direction of the core axis, thereby obtaining a spherical annular seal member which included the spherical annular base member defining the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as expanded graphite and the metal wire net for the spherical annular base member were compressed and intertwined with each other. The spherical annular base member included the reinforcing member made from the compressed metal wire net and the heat-resistant material made from expanded graphite filling meshes of this reinforcing member and compressed in such a manner as to be formed integrally with this reinforcing member in mixed form. In the outer layer, the heat-resistant material made from expanded graphite, the solid lubricant consisting of the lubricating composition containing 10% by mass of PTFE, 10% by mass of FEP, and 80% by mass of h-BN, and the reinforcing member made from the metal wire net for the outer layer were compressed such that the solid lubricant and the heat-resistant material made from expanded graphite of the expanded graphite sheet were filled in the meshes of the metal wire net of the reinforcing member, and such that the solid lubricant, the heat-resistant material, and the reinforcing member were integrated in mixed form, the outer surface of that outer layer being thus formed into a smooth surface in which the areas constituted by the metal wire net as the reinforcing member and the areas constituted by the solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.1% by mass, and the heat-resistant material constituted by expanded graphite of the expanded graphite sheet and the solid lubricant were contained at a ratio of 42.9% by mass. The density of the heat-resistant material constituted by expanded graphite of the expanded graphite sheet and the solid lubricant in the spherical annular base member and the outer layer was 1.60 Mg/m³. In addition, as for the outer layer, the reinforcing member constituted by the metal wire net was contained at a ratio of 65.7% by mass, and the heat-resistant material constituted by expanded graphite of the expanded graphite sheet and the solid lubricant were contained at a ratio of 34.3% by mass.

Example 2

The spherical annular seal member was fabricated in the same way as in Example 1 except that the coating layer of the solid lubricant (10% by mass of PTFE, 45% by mass of FEP, and 45% by mass of h-BN) was formed in the same way as in Example 1. In the fabricated spherical annular seal member, the solid lubricant of the outer layer was constituted by a lubricating composition containing 10% by mass of PTFE, 45% by mass of FEP, and 45% by mass of h-BN. Further, in the spherical annular base member and the outer layer, the reinforcing members for the spherical annular base member and the outer layer were contained at a ratio of 56.4% by mass, and the heat-resistant material constituted by expanded graphite and the solid lubricant were contained at a ratio of 43.6% by mass. The density of the heat-resistant material constituted by expanded graphite and the solid lubricant in the spherical annular base member and the outer layer was 1.61 Mg/m³. In addition, as for the outer layer, the reinforcing member constituted by the metal wire net was contained at a ratio of 65.7% by mass, and the heat-resistant material constituted by expanded graphite and the solid lubricant were contained at a ratio of 34.3% by mass.

Example 3

The spherical annular seal member was fabricated in the same way as in Example 1 except that, by using one austenitic stainless steel wire (SUS 304) having a wire diameter of 0.15 mm, a cylindrical knitted metal wire net having a mesh size which was 3.5 mm in vertical length and 1.5 mm in horizontal length was fabricated and was passed between a pair of rollers to form a belt-shaped metal wire net in the same way as in Example 1 and to be used as the metal wire net serving as the reinforcing member for the outer layer, and that the coating layer of the solid lubricant (45% by mass of PTFE, 45% by mass of FEP, and 10% by mass of h-BN) was formed in the same way as in Example 1. In the fabricated spherical annular seal member, the solid lubricant of the outer layer consisted of a lubricating composition containing 45% by mass of PTFE, 45% by mass of FEP, and 10% by mass of h-BN. Further, in the spherical annular base member and the outer layer, the reinforcing members for the spherical annular base member and the outer layer were contained at a ratio of 55.8% by mass, and the heat-resistant material constituted by expanded graphite and the solid lubricant were contained at a ratio of 44.2% by mass. The density of the heat-resistant material constituted by expanded graphite and the solid lubricant in the spherical annular base member and the outer layer was 1.62 Mg/m³. In addition, as for the outer layer, the reinforcing member constituted by the metal wire net was contained at a ratio of 31.0% by mass, and the heat-resistant material constituted by expanded graphite and the solid lubricant were contained at a ratio of 69.0% by mass.

Example 4

The spherical annular seal member was fabricated in the same way as in Example 1 except that the coating layer of the solid lubricant (40% by mass of PTFE, 10% by mass of FEP, and 50% by mass of h-BN) was formed in the same way as in Example 1. In the fabricated spherical annular seal member, the solid lubricant of the outer layer consisted of a lubricating composition containing 40% by mass of PTFE, 10% by mass of FEP, and 50% by mass of h-BN. Further, in the spherical annular base member and the outer layer, the reinforcing members for the spherical annular base member and the outer layer were contained at a ratio of 67.5% by mass, and the heat-resistant material constituted by expanded graphite and the solid lubricant were contained at a ratio of 32.5% by mass. The density of the heat-resistant material constituted by expanded graphite and the solid lubricant in the spherical annular base member and the outer layer was 1.68 Mg/m³. In addition, as for the outer layer, the reinforcing member constituted by the metal wire net was contained at a ratio of 66.2% by mass, and the heat-resistant material constituted by expanded graphite and the solid lubricant were contained at a ratio of 33.8% by mass.

Example 5

The spherical annular seal member was fabricated in the same way as in Example 1 except that the coating layer of the solid lubricant (25% by mass of PTFE, 15% by mass of FEP, and 60% by mass of h-BN) was formed in the same way as in Example 1. In the fabricated spherical annular seal member, the solid lubricant of the outer layer consisted of a lubricating composition containing 25% by mass of PTFE, 15% by mass of FEP, and 60% by mass of h-BN. Further, in the spherical annular base member and the outer layer, the reinforcing members for the spherical annular base member and the outer layer were contained at a ratio of 56.3% by mass, and the heat-resistant material constituted by expanded graphite and the solid lubricant were contained at a ratio of 43.7% by mass. The density of the heat-resistant material constituted by expanded graphite and the solid lubricant in the spherical annular base member and the outer layer was 1.66 $Mg/m^3$. In addition, as for the outer layer, the reinforcing member constituted by the metal wire net was contained at a ratio of 65.0% by mass, and the heat-resistant material constituted by expanded graphite and the solid lubricant were contained at a ratio of 35.0% by mass.

Example 6

The spherical annular seal member was fabricated in the same way as in Example 1 except that a cylindrical knitted metal wire net, which was fabricated by using two austenitic stainless steel wires (SUS 304) with a wire diameter of 0.28 mm as the fine metal wires and whose mesh size was 4 mm in vertical length and 5 mm in horizontal length, was used as the metal wire net serving as the reinforcing member for the spherical annular base member, that an expanded graphite sheet (heat-resistant material III) having a density of 1.12 $Mg/m^3$ and a thickness of 0.38 mm was used as the heat-resistant material, and that the coating layer of the solid lubricant (12% by mass of PTFE, 28% by mass of FEP, and 60% by mass of h-BN) was formed in the same way as in Example 1. In the fabricated spherical annular seal member, the solid lubricant of the outer layer consisted of a lubricating composition containing 12% by mass of PTFE, 28% by mass of FEP, and 60% by mass of h-BN. Further, in the spherical annular base member and the outer layer, the reinforcing members for the spherical annular base member and the outer layer were contained at a ratio of 63.3% by mass, and the heat-resistant material constituted by expanded graphite and the solid lubricant were contained at a ratio of 36.7% by mass. The density of the heat-resistant material constituted by expanded graphite and the solid lubricant in the spherical annular base member and the outer layer was 1.70 $Mg/m^3$. In addition, as for the outer layer, the reinforcing member constituted by the metal wire net was contained at a ratio of 65.7% by mass, and the heat-resistant material constituted by expanded graphite and the solid lubricant were contained at a ratio of 34.3% by mass.

Example 7

The spherical annular seal member was fabricated in the same way as in Example 1 except that a cylindrical knitted metal wire net similar to that of Example 6 was used as the metal wire net serving as the reinforcing member for the spherical annular base member, and that the coating layer of the solid lubricant (10% by mass of PTFE, 40% by mass of FEP, and 50% by mass of h-BN) was formed in the same way as in Example 1. In the fabricated spherical annular seal member, the solid lubricant of the outer layer consisted of a lubricating composition containing 10% by mass of PTFE, 40% by mass of FEP, and 50% by mass of h-BN. Further, in the spherical annular base member and the outer layer, the reinforcing members for the spherical annular base member and the outer layer, which were constituted by metal wire nets, were contained at a ratio of 63.4% by mass, and the heat-resistant material constituted by expanded graphite and the solid lubricant were contained at a ratio of 36.6% by mass. The density of the heat-resistant material constituted by expanded graphite and the solid lubricant in the spherical annular base member and the outer layer was 1.68 $Mg/m^3$. In addition, as for the outer layer, the reinforcing member constituted by the metal wire net was contained at a ratio of 65.4% by mass, and the heat-resistant material constituted by expanded graphite and the solid lubricant were contained at a ratio of 34.6% by mass.

Example 8

The spherical annular seal member was fabricated in the same way as in Example 1 except that the coating layer of the solid lubricant (20% by mass of PTFE, 40% by mass of FEP, and 40% by mass of h-BN) was formed in the same way as in Example 1. In the fabricated spherical annular seal member, the solid lubricant of the outer layer consisted of a lubricating composition containing 20% by mass of PTFE, 40% by mass of FEP, and 40% by mass of h-BN. Further, in the spherical annular base member and the outer layer, the reinforcing members for the spherical annular base member and the outer layer were contained at a ratio of 56.1% by mass, and the heat-resistant material constituted by expanded graphite and the solid lubricant were contained at a ratio of 43.9% by mass. The density of the heat-resistant material constituted by expanded graphite and the solid lubricant in the spherical annular base member and the outer layer was 1.62 $Mg/m^3$. In addition, as for the outer layer, the reinforcing member constituted by the metal wire net was contained at a ratio of 63.9% by mass, and the heat-resistant material constituted by expanded graphite and the solid lubricant were contained at a ratio of 36.1% by mass.

Example 9

The spherical annular seal member was fabricated in the same way as in Example 1 except that the coating layer of the solid lubricant (25% by mass of PTFE, 25% by mass of FEP, and 50% by mass of h-BN) was formed in the same way as in Example 1. In the fabricated spherical annular seal member, the solid lubricant of the outer layer consisted of a lubricating composition containing 25% by mass of PTFE, 25% by mass of FEP, and 50% by mass of h-BN. Further, in the spherical annular base member and the outer layer, the reinforcing members for the spherical annular base member and the outer layer were contained at a ratio of 56.7% by mass, and the heat-resistant material constituted by expanded graphite and the solid lubricant were contained at a ratio of 43.3% by mass. The density of the heat-resistant material constituted by expanded graphite and the solid lubricant in the spherical annular base member and the outer layer was 1.60 $Mg/m^3$. In addition, as for the outer layer, the reinforcing member constituted by the metal wire net was contained at a ratio of 65.9% by mass, and the heat-resistant material constituted by expanded graphite and the solid lubricant were contained at a ratio of 34.1% by mass.

Example 10

The spherical annular seal member was fabricated in the same way as in Example 1 except that the coating layer of the solid lubricant (28% by mass of PTFE, 22% by mass of FEP, and 50% by mass of h-BN) was formed in the same way as in Example 1. In the fabricated spherical annular seal member, the solid lubricant of the outer layer consisted of a lubricating composition containing 28% by mass of PTFE, 22% by mass of FEP, and 50% by mass of h-BN. Further, in the spherical annular base member and the outer layer, the reinforcing members for the spherical annular base member and the outer layer were contained at a ratio of 56.5% by mass, and the heat-resistant material constituted by expanded graphite and the solid lubricant were contained at a ratio of 43.5% by mass. The density of the heat-resistant material constituted by expanded graphite and the solid lubricant in the spherical annular base member and the outer layer was 1.61 $Mg/m^3$. In addition, as for the outer layer, the reinforcing member constituted by the metal wire net was contained at a ratio of 64.8% by mass, and the heat-resistant material constituted by expanded graphite and the solid lubricant were contained at a ratio of 35.2% by mass.

Example 11

The spherical annular seal member was fabricated in the same way as in Example 1 except that the coating layer of the solid lubricant (38% by mass of PTFE, 22% by mass of FEP, and 40% by mass of h-BN) was formed in the same way as in Example 1. In the fabricated spherical annular seal member, the solid lubricant of the outer layer consisted of a lubricating composition containing 38% by mass of PTFE, 22% by mass of FEP, and 40% by mass of h-BN. Further, in the spherical annular base member and the outer layer, the reinforcing members for the spherical annular base member and the outer layer were contained at a ratio of 56.3% by mass, and the heat-resistant material constituted by expanded graphite and the solid lubricant were contained at a ratio of 43.7% by mass. The density of the heat-resistant material constituted by expanded graphite and the solid lubricant in the spherical annular base member and the outer layer was 1.61 $Mg/m^3$. In addition, as for the outer layer, the reinforcing member constituted by the metal wire net was contained at a ratio of 64.6% by mass, and the heat-resistant material constituted by expanded graphite and the solid lubricant were contained at a ratio of 35.4% by mass.

Example 12

The spherical annular seal member was fabricated in the same way as in Example 1 except that, by using two austenitic stainless steel wire (SUS 304) with a wire diameter of 0.28 mm as the fine metal wires, a cylindrical knitted metal wire net having a mesh size which was 4 mm in vertical length and 5 mm in horizontal length was fabricated and was passed between a pair of rollers to form a belt-shaped metal wire net in the same way as in Example 1 and to be used as the metal wire net serving as the reinforcing member for the spherical annular base member, that an expanded graphite sheet (heat-resistant material III) having a heat-material density of 1.12 $Mg/m^3$ and a thickness of 0.38 mm was used as the expanded graphite sheet for the tubular base member, and that the coating layer of the solid lubricant (35% by mass of PTFE, 15% by mass of FEP, and 50% by mass of h-BN) was formed in the same way as in Example 1. In the fabricated spherical annular seal member, the solid lubricant of the outer layer consisted of a lubricating composition containing 35% by mass of PTFE, 15% by mass of FEP, and 50% by mass of h-BN. Further, in the spherical annular base member and the outer layer, the reinforcing members for the spherical annular base member and the outer layer were contained at a ratio of 55.7% by mass, and the heat-resistant material constituted by expanded graphite and the solid lubricant were contained at a ratio of 44.3% by mass. The density of the heat-resistant material constituted by expanded graphite and the solid lubricant in the spherical annular base member and the outer layer was 1.70 $Mg/m^3$. In addition, as for the outer layer, the reinforcing member constituted by the metal wire net was contained at a ratio of 63.4% by mass, and the heat-resistant material constituted by expanded graphite and the solid lubricant were contained at a ratio of 36.6% by mass.

Example 13

The spherical annular seal member was fabricated in the same way as in Example 1 except that the coating layer of the solid lubricant (20% by mass of PTFE, 20% by mass of FEP, 40% by mass of h-BN, and 20% by mass of hydrated alumina) was formed in the same way as in Example 1. In the fabricated spherical annular seal member, the solid lubricant of the outer layer consisted of a lubricating composition containing 20% by mass of PTFE, 20% by mass of FEP, 40% by mass of h-BN, and 20% by mass of hydrated alumina. Further, in the spherical annular base member and the outer layer, the reinforcing members for the spherical annular base member and the outer layer were contained at a ratio of 55.5% by mass, and the heat-resistant material constituted by expanded graphite and the solid lubricant were contained at a ratio of 44.5% by mass. The density of the heat-resistant material constituted by expanded graphite and the solid lubricant in the spherical annular base member and the outer layer was 1.66 $Mg/m^3$. In addition, as for the outer layer, the reinforcing member constituted by the metal wire net was contained at a ratio of 62.7% by mass, and the heat-resistant material constituted by expanded graphite and the solid lubricant were contained at a ratio of 37.3% by mass.

Example 14

The spherical annular seal member was fabricated in the same way as in Example 1 except that the coating layer of the solid lubricant (25% by mass of PTFE, 25% by mass of FEP, 43% by mass of h-BN, and 7% by mass of hydrated alumina) was formed in the same way as in Example 1. In the fabricated spherical annular seal member, the solid lubricant of the outer layer consisted of a lubricating composition containing 25% by mass of PTFE, 25% by mass of FEP, 43% by mass of h-BN, and 7% by mass of hydrated alumina. Further, in the spherical annular base member and the outer layer, the reinforcing members for the spherical annular base member and the outer layer were contained at a ratio of 55.9% by mass, and the heat-resistant material constituted by expanded graphite and the solid lubricant were contained at a ratio of 44.1% by mass. The density of the heat-resistant material constituted by expanded graphite and the solid lubricant in the spherical annular base member and the outer layer was 1.67 $Mg/m^3$. In addition, as for the outer layer, the reinforcing member constituted by the metal wire net was contained at a ratio of 63.4% by mass, and the heat-resistant material constituted by expanded graphite and the solid lubricant were contained at a ratio of 36.6% by mass.

Example 15

The spherical annular seal member was fabricated in the same way as in Example 1 except that the coating layer of the solid lubricant (20% by mass of PTFE, 28% by mass of FEP, 50% by mass of h-BN, and 2% by mass of hydrated alumina) was formed in the same way as in Example 1. In the fabricated spherical annular seal member, the solid lubricant of the outer layer consisted of a lubricating composition containing 20% by mass of PTFE, 28% by mass of FEP, 50% by mass of h-BN, and 2% by mass of hydrated alumina. Further, in the spherical annular base member and the outer layer, the reinforcing members for the spherical annular base member and the outer layer were contained at a ratio of 56.3% by mass, and the heat-resistant material constituted by expanded graphite and the solid lubricant were contained at a ratio of 43.7% by mass. The density of the heat-resistant material constituted by expanded graphite and the solid lubricant in the spherical annular base member and the outer layer was 1.66 Mg/m$^3$. In addition, as for the outer layer, the reinforcing member constituted by the metal wire net was contained at a ratio of 65.0% by mass, and the heat-resistant material constituted by expanded graphite and the solid lubricant were contained at a ratio of 35.0% by mass.

Example 16

The spherical annular seal member was fabricated in the same way as in Example 1 except that an expanded graphite sheet having a coating layer of the solid lubricant (25% by mass of PTFE, 25% by mass of FEP, and 50% by mass of h-BN) similar to that of Example 9 was subjected to sintering in a heating furnace at a temperature of 340° C. for 20 minutes, to thereby form a sintered coating layer of the solid lubricant (25% by mass of PTFE, 25% by mass of FEP, and 50% by mass of h-BN) on the surface of the expanded graphite sheet. In the fabricated spherical annular seal member, the sintered solid lubricant of the outer layer consisted of a lubricating composition containing 25% by mass of PTFE, 25% by mass of FEP, and 50% by mass of h-BN. The outer surface of the outer layer was formed into a smooth surface in which the areas constituted by the metal wire net as the reinforcing member and the areas constituted by the sintered solid lubricant were present in mixed form. Further, in the spherical annular base member and the outer layer, the reinforcing members for the spherical annular base member and the outer layer were contained at a ratio of 55.6% by mass, and the heat-resistant material constituted by expanded graphite and the sintered solid lubricant were contained at a ratio of 44.4% by mass. The density of the heat-resistant material constituted by expanded graphite and the sintered solid lubricant in the spherical annular base member and the outer layer was 1.67 Mg/m$^3$. In addition, as for the outer layer, the reinforcing member constituted by the metal wire net was contained at a ratio of 64.2% by mass, and the heat-resistant material constituted by expanded graphite and the solid lubricant were contained at a ratio of 35.8% by mass.

Example 17

The spherical annular seal member was fabricated in the same way as in Example 1 except that an expanded graphite sheet having a coating layer of the solid lubricant (35% by mass of PTFE, 15% by mass of FEP, and 50% by mass of h-BN) similar to that of Example 12 was subjected to sintering in the same way as in Example 16, to thereby form a sintered coating layer of the solid lubricant (35% by mass of PTFE, 15% by mass of FEP, and 50% by mass of h-BN) on the surface of the expanded graphite sheet. In the fabricated spherical annular seal member, the sintered solid lubricant of the outer layer consisted of a lubricating composition containing 35% by mass of PTFE, 15% by mass of FEP, and 50% by mass of h-BN. The outer surface of the outer layer was formed into a smooth surface in which the areas constituted by the metal wire net as the reinforcing member and the areas constituted by the sintered solid lubricant were present in mixed form. Further, in the spherical annular base member and the outer layer, the reinforcing members for the spherical annular base member and the outer layer were contained at a ratio of 56.9% by mass, and the heat-resistant material constituted by expanded graphite and the sintered solid lubricant were contained at a ratio of 43.1% by mass. The density of the heat-resistant material constituted by expanded graphite and the sintered solid lubricant in the spherical annular base member and the outer layer was 1.67 Mg/m$^3$. In addition, as for the outer layer, the reinforcing member constituted by the metal wire net was contained at a ratio of 65.0% by mass, and the heat-resistant material constituted by expanded graphite and the sintered solid lubricant were contained at a ratio of 35.0% by mass.

Example 18

The spherical annular seal member was fabricated in the same way as in Example 1 except that an expanded graphite sheet having a coating layer of the solid lubricant (20% by mass of PTFE, 28% by mass of FEP, 50% by mass of h-BN, and 2% by mass of hydrated alumina) similar to that of Example 15 was subjected to sintering in the same way as in Example 16, to thereby form a sintered coating layer of the solid lubricant (20% by mass of PTFE, 28% by mass of FEP, 50% by mass of h-BN, and 2% by mass of hydrated alumina) on the surface of the expanded graphite sheet. The sintered solid lubricant of the outer layer consisted of a lubricating composition containing 20% by mass of PTFE, 28% by mass of FEP, 50% by mass of h-BN, and 2% by mass of hydrated alumina. The outer surface of the outer layer was formed into a smooth surface in which the areas constituted by the metal wire net as the reinforcing member and the areas constituted by the sintered solid lubricant were present in mixed form. Further, in the spherical annular base member and the outer layer, the reinforcing members for the spherical annular base member and the outer layer were contained at a ratio of 56.1% by mass, and the heat-resistant material constituted by expanded graphite and the solid lubricant were contained at a ratio of 43.9% by mass. The density of the heat-resistant material constituted by expanded graphite and the solid lubricant in the spherical annular base member and the outer layer was 1.66 Mg/m$^3$. In addition, as for the outer layer, the reinforcing member constituted by the metal wire net was contained at a ratio of 65.2% by mass, and the heat-resistant material constituted by expanded graphite and the solid lubricant were contained at a ratio of 34.8% by mass.

Example 19

The spherical annular seal member was fabricated in the same way as in Example 1 except that a coating layer of the solid lubricant (10% by mass of PTFE, 40% by mass of FEP, and 50% by mass of h-BN) similar to that of Example 7 and consisting of a lubricating composition of PTFE, FEP, and h-BN was formed on one surface of an expanded graphite sheet similar to that of Example 1, that a strip-shaped belt-shaped metal wire net serving as the reinforcing member for the outer layer and similar to that of Example 1 was superposed on the other surface (reverse surface) of that expanded graphite sheet having this costing layer on its surface, and this superposed assembly of the belt-shaped metal wire net and the expanded graphite sheet having the costing layer of the solid lubricant was fed between the pair of cylindrical rollers so as to be integrated to thereby fabricate an outer-layer forming member where only the solid lubricant of the costing layer was exposed on one surface thereof, and that this outer-layer forming member with the costing layer placed on the outer side was wound around the outer peripheral surface of the tubular base member, to thereby prepare a cylindrical preform. In the fabricated spherical annular seal member, as for the outer layer, the heat-resistant material made from expanded graphite and the reinforcing member made from the metal wire net were compressed and integrated in mixed form with the heat-resistant material made from expanded graphite being filled in the meshes of the metal wire net of the reinforcing member. The outer surface of the outer layer was formed into a smooth surface of the solid lubricant which covered both the surface of the reinforcing member made from the metal wire net and the surface of expanded graphite filled in the meshes of the reinforcing member and which was constituted by the lubricating composition containing 10% by mass of PTFE, 40% by mass of FEP, and 50% by mass of h-BN. Further, in the spherical annular base member and the outer layer, the reinforcing members for the spherical annular base member and the outer layer were contained at a ratio of 54.8% by mass, and the heat-resistant material constituted by expanded graphite and the solid lubricant were contained at a ratio of 45.2% by mass. The density of the heat-resistant material constituted by expanded graphite and the solid lubricant in the spherical annular base member and the outer layer was 1.65 Mg/m$^3$. In addition, as for the outer layer, the reinforcing member constituted by the metal wire net was contained at a ratio of 62.7% by mass, and the heat-resistant material constituted by expanded graphite and the solid lubricant were contained at a ratio of 37.3% by mass.

Example 20

The spherical annular seal member was fabricated in the same way as in Example 19 except that an outer-layer forming member where only a coating layer of the solid lubricant (25% by mass of PTFE, 25% by mass of FEP, and 50% by mass of h-BN) similar to that of Example 9 was exposed on one surface thereof was fabricated in the same way as in Example 19. In the fabricated spherical annular seal member, as for the outer layer, the heat-resistant material made from expanded graphite and the reinforcing member made from the metal wire net were compressed and integrated in mixed form with the heat-resistant material made from expanded graphite being filled in the meshes of the metal wire net of the reinforcing member. The outer surface of the outer layer was formed into a smooth surface of the solid lubricant which covered both the surface of the reinforcing member made from the metal wire net and the surface of expanded graphite filled in the meshes of the reinforcing member and which was constituted by the lubricating composition containing 25% by mass of PTFE, 25% by mass of FEP, and 50% by mass of h-BN. Further, in the spherical annular base member and the outer layer, the reinforcing members made from the metal wire net for the spherical annular base member and the outer layer were contained at a ratio of 56.7% by mass, and the heat-resistant material constituted by expanded graphite and the solid lubricant were contained at a ratio of 43.3% by mass. The density of the heat-resistant material constituted by expanded graphite and the solid lubricant in the spherical annular base member and the outer layer was 1.60 Mg/m$^3$. In addition, as for the outer layer, the reinforcing member constituted by the metal wire net was contained at a ratio of 65.0% by mass, and the heat-resistant material constituted by expanded graphite and the solid lubricant were contained at a ratio of 35.0% by mass.

Example 21

The spherical annular seal member was fabricated in the same way as in Example 19 except that an outer-layer forming member where only a coating layer of the solid lubricant (20% by mass of PTFE, 28% by mass of FEP, 50% by mass of h-BN, and 2% by mass of hydrated alumina) similar to that of Example 15 was exposed on one surface thereof was fabricated in the same way as in Example 19. In this fabricated spherical annular seal member, as for the outer layer, the heat-resistant material made from expanded graphite and the reinforcing member made from the metal wire net were compressed and integrated in mixed form with the heat-resistant material made from expanded graphite being filled in the meshes of the metal wire net of the reinforcing member. The outer surface of the outer layer was formed into a smooth surface of the solid lubricant which covered both the surface of the reinforcing member made from the metal wire net and the surface of expanded graphite filled in the meshes of the reinforcing member and which was constituted by the lubricating composition containing 20% by mass of PTFE, 28% by mass of FEP, 50% by mass of h-BN, and 2% by mass of hydrated alumina. Further, in the spherical annular base member and the outer layer, the reinforcing members made from the metal wire net for the spherical annular base member and the outer layer were contained at a ratio of 56.5% by mass, and the heat-resistant material constituted by expanded graphite and the solid lubricant were contained at a ratio of 43.5% by mass. The density of the heat-resistant material constituted by expanded graphite and the solid lubricant in the spherical annular base member and the outer layer was 1.60 Mg/m$^3$. In addition, as for the outer layer, the reinforcing member constituted by the metal wire net was contained at a ratio of 65.8% by mass, and the heat-resistant material constituted by expanded graphite and the solid lubricant were contained at a ratio of 34.2% by mass.

Comparative Example 1

The tubular base member was fabricated in the same way as in Example 1. An aqueous dispersion (solid content: 60%) consisting of 50% by mass of PTFE, 5% by mass of a surfactant, and 45% by mass of water was prepared. This aqueous dispersion was roller coated on one surface of a separately prepared expanded graphite sheet (heat-resistant material I) serving as a heat-resistant material and was dried at a temperature of 100° C., thereby forming a coating layer of PTFE. The expanded graphite sheet having the costing layer of PTFE was superposed on the belt-shaped metal wire net for the outer layer of Example 1 with the costing layer facing upward, and an assembly thereof was passed between a pair of rollers so as to be integrated, thereby fabricating the outer-layer forming member. A cylindrical preform was fabricated by winding the outer-layer forming member around the outer peripheral surface of the tubular base member in a state in which its surface where the PTFE coating layer was exposed was located on the outer side. Thereafter, the spherical annular seal member was fabricated in the same method as that of Example 1. In the fabricated spherical annular seal member, as for the outer layer, the heat-resistant material made from expanded graphite, the solid lubricant constituted by PTFE, and the reinforcing member made from the metal wire net for the outer layer were compressed such that the heat-resistant material made from expanded graphite was filled in the meshes of the metal wire net of the reinforcing member, allowing the heat-resistant material and the reinforcing member to be integrated in mixed form. The outer surface of that outer layer was formed into a smooth surface where the surface of the solid lubricant constituted by PTFE was exposed. In the spherical annular base member and the outer layer, the reinforcing members made from the metal wire net for the spherical annular base member and the outer layer were contained at a ratio of 51.9% by mass, and the heat-resistant material constituted by expanded graphite and the sintered solid lubricant were contained at a ratio of 48.1% by mass. The density of the heat-resistant material constituted by expanded graphite and the sintered solid lubricant in the spherical annular base member and the outer layer was 1.56 Mg/m$^3$. In addition, as for the outer layer, the reinforcing member constituted by the metal wire net was contained at a ratio of 50.8% by mass, and the heat-resistant material constituted by expanded graphite and the solid lubricant were contained at a ratio of 49.2% by mass.

Comparative Example 2

The tubular base member was fabricated in the same way as in Example 1. An aqueous dispersion similar to that of Comparative Example 1 was roller coated on one surface of an expanded graphite sheet similar to that of Example 1 and was dried at a temperature of 100° C. to form a coating layer of PTFE. Subsequently, the expanded graphite sheet having this PTFE coating layer was subjected to sintering in a heating furnace at a temperature of 340° C. for 20 minutes, allowing a sintered coating layer of the solid lubricant constituted by PTFE to be formed on the surface of that expanded graphite sheet. The expanded graphite sheet having the sintered costing layer of the solid lubricant constituted by PTFE was superposed, with the sintered costing layer facing upward, on a belt-shaped metal wire net similar to that of Example 1 and serving as the reinforcing member for the outer layer holding therein an expanded graphite sheet similar to that of Example 1. This superposed assembly was passed between a pair of rollers so as to be integrated, thereby fabricating the outer-layer forming member. A cylindrical preform was fabricated by winding the outer-layer forming member around the outer peripheral surface of the tubular base member in a state in which its surface where the sintered coating layer of the solid lubricant was exposed was located on the outer side. Thereafter, the spherical annular seal member was fabricated in the same method as that of Example 1. In the fabricated spherical annular seal member, as for the outer layer, the heat-resistant material made from expanded graphite, the sintered solid lubricant constituted by PTFE, and the reinforcing member made from the metal wire net were compressed such that the heat-resistant material made from expanded graphite was filled in the meshes of the metal wire net of the reinforcing member, allowing the heat-resistant material and the reinforcing member to be integrated in mixed form. The outer surface of that outer layer was formed into a smooth surface where the area constituted by the sintered solid lubricant of PTFE was exposed. In the spherical annular base member and the outer layer, the reinforcing members made from the metal wire net for the spherical annular base member and the outer layer were contained at a ratio of 51.8% by mass, and the heat-resistant material constituted by expanded graphite and the sintered solid lubricant were contained at a ratio of 48.2% by mass. The density of the heat-resistant material constituted by expanded graphite and the sintered solid lubricant in the spherical annular base member and the outer layer was 1.55 Mg/m$^3$. In addition, as for the outer layer, the reinforcing member constituted by the metal wire net was contained at a ratio of 51.4% by mass, and the heat-resistant material constituted by expanded graphite and the solid lubricant were contained at a ratio of 48.6% by mass.

Comparative Example 3

The tubular base member was fabricated in the same way as in Example 1. An aqueous dispersion (30% by mass of PTFE, 20% by mass of h-BN, 5% by mass of a surfactant, and 45% by mass of water), which dispersedly contained as a solid content 50% by mass of a lubricating composition (60% by mass of PTFE and 40% by mass of h-BN) dispersedly containing 150 pars by mass of a PTFE powder with an average particle size of 0.20 μm with respect to 100 parts by mass of an h-BN powder with an average particle size of 8 μm, was roller coated on one surface of a separately prepared expanded graphite sheet similar to that of Example 1 and was dried at a temperature of 100° C., thereby forming a coating layer (60% by mass of PTFE and 40% by mass of h-BN) of the solid lubricant on one surface of that expanded graphite sheet. The expanded graphite sheet having the costing layer of the solid lubricant constituted by 40% by mass of h-BN and 60% by mass of PTFE was superposed, with that costing layer facing upward, on a belt-shaped metal wire net similar to that of Example 1 and serving as the reinforcing member for the outer layer holding therein an expanded graphite sheet similar to that of Example 1. This superposed assembly was passed between a pair of rollers so as to be integrated, thereby fabricating the outer-layer forming member in which expanded graphite was filled in the meshes of the metal wire net of the reinforcing member. A cylindrical preform was fabricated by winding the aforementioned outer-layer forming member around the outer peripheral surface of the tubular base member in a state in which its surface where the solid lubricant was exposed was located on the outer side. The spherical annular seal member was fabricated in the same method as that of Example 1. In the fabricated spherical annular seal member, as for the outer layer, the heat-resistant material made from expanded graphite, the solid lubricant constituted by 40% by mass of h-BN and 60% by mass of PTFE, and the reinforcing member made from the metal wire net for the outer layer were compressed such that the heat-resistant material made from expanded graphite was filled in the meshes of the metal wire net of the reinforcing member, allowing the heat-resistant material and the reinforcing member to be integrated in mixed form. The outer surface of the outer layer was formed into a smooth surface where the area constituted by the solid lubricant was exposed. In the spherical annular base member and the outer layer, the reinforcing members made from the metal wire net for the spherical annular base member and the outer layer were contained at a ratio of 50.2% by mass, and the heat-resistant material constituted by expanded graphite and the sintered solid lubricant were contained at a ratio of 49.8% by mass. The density of the heat-resistant material constituted by expanded graphite and the sintered solid lubricant in the spherical annular base member and the outer layer was 1.56 Mg/m$^3$. In addition, as for the outer layer, the reinforcing member constituted by the metal wire net was contained at a ratio of 49.4% by mass, and the heat-resistant material constituted by expanded graphite and the solid lubricant were contained at a ratio of 50.6% by mass.

Next, the spherical annular seal members obtained in Examples 1 to 21 and Comparative Examples 1 to 3 were incorporated into the exhaust pipe spherical joint shown in FIG. 18, and tests were conducted on the presence or absence of generation of abnormal noise and the amount of gas leakage (1/min) due to stick-slip according to two test modes.

<Test Modes and Test Methods on Presence or Absence of Generation of Abnormal Noise>
<Test Mode (1)>
  Pressing force using coil springs (spring set load): 980 N
  Excitation amplitude: ±0.2°
  Excitation frequency: 22 Hz
  Temperature (outer surface temperature of the concave spherical surface portion 302 shown in FIG. 18):
    from room temperature (25° C.) to 500° C.
  Mating member (material of the flared portion 301 shown in FIG. 18):
    SUS 304
<Test Method>
  A 40-minute temperature history is set as one cycle in which vibration is started from room temperature (25° C.) at an excitation frequency of 22 Hz and an excitation amplitude of ±0.2°, and at a point of time when the temperature of the mating member surface (temperature of the outer surface of the concave spherical surface portion 302 shown in FIG. 18) reaches 500° C. in 10 minutes after excitation, the test piece is held at that temperature for 10 minutes, and the temperature of the test piece is then allowed to drop to room temperature in 20 minutes. The test is repeated for 9 cycles, and abnormal noise during the temperature drop is measured. Measurement was made after the 1st cycle, 3rd cycle, 6th cycle, and 9th cycle, and measurement temperatures of the respective cycles are set to 500° C., 400° C., 300° C., 200° C., and 100° C.
<Test Mode (2)>
  Pressing force using coil springs (spring set load): 980 N
  Excitation amplitude: ±0.15° and ±0.7°
  Excitation frequency: 10 Hz
  Temperature (outer surface temperature of the concave spherical surface portion 302 shown in FIG. 18):
    from room temperature (25° C.) to 500° C.
  Mating member (material of the flared portion 301 shown in FIG. 18):
    SUS 304
<Test Method>
  By setting an oscillation angle (excitation amplitude) to two levels of ±0.15° and ±0.7° and setting an excitation frequency to a fixed level of 10 Hz, test pieces were vibrated at the respective oscillation angles. The outer surface temperature of the concave spherical surface portion 302 shown in FIG. 18 was raised from 200° C. by 50° C. each until the temperature reached 550° C., and at a point of time when each temperature was reached, the test pieces were oscillated for 10 minutes. The test of the above-described process was set as one cycle, and three cycles were performed. In Example 2, Example 9, Example 15, Example 17, and Comparative Example 2, measurement was made of the presence or absence of generation of abnormal noise at each temperature, and in other Examples and Comparative Example, measurement was made of the presence or absence of generation of abnormal noise at the temperature of 550° C.

The determination of the presence or absence of generation of abnormal noise in the test modes (1) and (2) was made in accordance with the following criteria.

<Judgment Levels of Abnormal Noise>
  Code 0: No abnormal noise is generated.
  Code 0.5: The generation of abnormal noise can be confirmed by a sound collection pipe.
  Code 1: The generation of abnormal noise can be confirmed at a position approx. 0.2 m away from the sliding portion of the exhaust pipe spherical joint.
  Code 1.5: The generation of abnormal noise can be confirmed at a position approx. 0.5 m away from the sliding portion of the exhaust pipe spherical joint.
  Code 2: The generation of abnormal noise can be confirmed at a position approx. 1 m away from the sliding portion of the exhaust pipe spherical joint.
  Code 2.5: The generation of abnormal noise can be confirmed at a position approx. 2 m away from the sliding portion of the exhaust pipe spherical joint.
  Code 3: The generation of abnormal noise can be confirmed at a position approx. 3 m away from the sliding portion of the exhaust pipe spherical joint.
  Code 3.5: The generation of abnormal noise can be confirmed at a position approx. 5 m away from the sliding portion of the exhaust pipe spherical joint.
  Code 4: The generation of abnormal noise can be confirmed at a position approx. 10 m away from the sliding portion of the exhaust pipe spherical joint.
  Code 4.5: The generation of abnormal noise can be confirmed at a position approx. 15 m away from the sliding portion of the exhaust pipe spherical joint.
  Code 5: The generation of abnormal noise can be confirmed at a position approx. 20 m away from the sliding portion of the exhaust pipe spherical joint.

In the overall assessment of the above-described determination levels, with respect to Codes 0 to 2.5 a determination was made that no abnormal noise was generated (accepted), whereas with respect to Codes 3 to 5 a determination was made that abnormal noise was generated (rejected).

<Test Mode and Test Method of the Amount of Gas Leakage>
<Test Mode>
  Pressing force using coil springs (spring set load): 980 N
  Excitation angle: ±2.5°
  Excitation frequency: 5 Hz
  Temperature (outer surface temperature of the concave spherical surface portion 302 shown in FIG. 18):
    from room temperature (25° C.) to 500° C.
  Number of oscillating motions: 1,000,000
  Mating member (material of the flared portion 301 shown in FIG. 18):
    SUS 304
<Test Method>
  The outer surface temperature of the concave spherical surface portion 302 shown in FIG. 18 was raised up to 500° C. while continuing the oscillating motion at an excitation amplitude of ±2.5° and at an excitation frequency of 5 Hz at room temperature (25° C.). The oscillating motion was continued in a state in which that temperature was held, and the amount of gas leakage was measured at the point of time when the number of oscillating motions reached 1,000,000.

<Measurement Method of Gas Leakage Amount>

An opening of the upstream-side exhaust pipe 100 of the exhaust pipe spherical joint shown in FIG. 18 was closed, and dry air was allowed to flow in from the downstream-side exhaust pipe 300 side under a pressure of 0.049 Mpa (0.5 kgf/cm²). The amount of leakage from the joint portion (sliding contact portions between the surface 42 of the spherical annular seal member 38 and the inner surface 304 of the concave spherical surface portion 302, fitting portions between the spherical annular seal member 38 at the cylindrical inner surface 32 and the pipe end portion 101 of the upstream-side exhaust pipe 100, and contact portions between the annular end face 34 and the flange 200 provided uprightly on the upstream-side exhaust pipe 100) was measured by means of a flowmeter 4 times, i.e., (1) at an early period of test (before testing start), (2) after 250,000 oscillating motions, (3) after 500,000 oscillating motions, and (4) after 1,000,000 oscillating motions.

Tables 1 to 9 show the results of the above-described tests.

TABLE 1

| | | | Examples | | | | | |
|---|---|---|---|---|---|---|---|---|
| | | | 1 | 2 | 3 | 4 | 5 | 6 |
| <Solid lubricant of outer layer> | | | | | | | | |
| PTFE | | | 10 | 10 | 45 | 40 | 25 | 12 |
| FEP | | | 10 | 45 | 45 | 10 | 15 | 28 |
| h-BN | | | 80 | 45 | 10 | 50 | 60 | 60 |
| Hydrated alumina (bainite) | | | — | — | — | — | — | — |
| Sintered or not | | | no | no | no | no | no | no |
| Presence or absence of exposed surface of metal wire net at outer peripheral surface of outer layer | | | present | present | present | present | present | present |
| Determination of abnormal noise in test mode (1) | 1st cycle | 500° C. | 0.5 | 0 | 0 | 0 | 0.5 | 0.5 |
| | | 400° C. | 0.5 | 0 | 0 | 0 | 0.5 | 0.5 |
| | | 300° C. | 1 | 0 | 0 | 0 | 0 | 0.5 |
| | | 200° C. | 0.5 | 0 | 0 | 0 | 0 | 0 |
| | | 100° C. | 0.5 | 0 | 0 | 0 | 0 | 0 |
| | 3rd cycle | 500° C. | 1 | 0.5 | 0 | 0.5 | 1 | 1 |
| | | 400° C. | 1 | 0.5 | 0 | 0.5 | 1 | 1 |
| | | 300° C. | 1 | 0.5 | 0 | 0.5 | 0.5 | 1 |
| | | 200° C. | 0.5 | 0 | 0 | 0 | 0.5 | 0.5 |
| | | 100° C. | 1 | 0 | 0 | 0 | 1 | 0.5 |
| | 6th cycle | 500° C. | 1 | 1 | 0.5 | 1.5 | 1.5 | 1 |
| | | 400° C. | 1 | 1 | 0.5 | 1 | 1.5 | 1 |
| | | 300° C. | 1 | 0.5 | 0.5 | 1 | 1 | 1 |
| | | 200° C. | 1 | 0 | 0.5 | 0 | 1 | 0.5 |
| | | 100° C. | 0.5 | 0 | 0 | 0 | 1 | 0.5 |
| | 9th cycle | 500° C. | 1 | 0.5 | 1 | 1.5 | 1.5 | 1.5 |
| | | 400° C. | 1 | 0.5 | 1 | 1.5 | 1.5 | 1.5 |
| | | 300° C. | 1 | 0.5 | 0.5 | 0 | 1.5 | 1 |
| | | 200° C. | 1 | 0 | 0.5 | 0 | 1 | 0.5 |
| | | 100° C. | 0.5 | 0 | 0 | 0 | 1 | 0.5 |
| | No. of cycles | <Oscillation angle> | | | | | | |
| Determination of abnormal noise in test mode (2) | 1 cycle | ±0.15° | 0 | Table 5 | 0 | 0 | 0 | 0 |
| | | ±0.7° | 0 | | 0 | 0 | 0 | 0 |
| | 2 cycles | ±0.15° | 0-0.5 | | 0-1 | 0-0.5 | 0-1 | 0-1 |
| | | ±0.7° | 0-0.5 | | 0-1 | 0-0.5 | 0-1.5 | 0.5-1 |
| | 3 cycles | ±0.15° | 0-0.5 | | 0-1.5 | 0-1.5 | 0.5-1.5 | 1-1.5 |
| | | ±0.7° | 0-1 | | 0.5-1.5 | 0.5-1.5 | 0.5-1.5 | 0.5-1.5 |
| Overall judgment of presence or absence of abnormal noise | | | accepted | accepted | accepted | accepted | accepted | accepted |
| <Amount of gas leakage (l/min)> | | (1) | 0.05 | 0.05 | 0.05 | 0.05 | 0.05 | 0.05 |
| | | (2) | 0.12 | 0.10 | 0.10 | 0.12 | 0.14 | 0.15 |
| | | (3) | 0.23 | 0.24 | 0.22 | 0.25 | 0.24 | 0.24 |
| | | (4) | 0.44 | 0.43 | 0.42 | 0.44 | 0.38 | 0.36 |

TABLE 2

| | Examples | | | | | |
|---|---|---|---|---|---|---|
| | 7 | 8 | 9 | 10 | 11 | 12 |
| <Solid lubricant of outer layer> | | | | | | |
| PTFE | 10 | 20 | 25 | 28 | 38 | 35 |
| FEP | 40 | 40 | 25 | 22 | 22 | 15 |
| h-BN | 50 | 40 | 50 | 50 | 40 | 50 |
| Hydrated alumina (bainite) | — | — | — | — | — | — |

TABLE 2-continued

|  |  |  | Examples | | | | | |
| --- | --- | --- | --- | --- | --- | --- | --- | --- |
|  |  |  | 7 | 8 | 9 | 10 | 11 | 12 |
| Sintered or not |  |  | no | no | no | no | no | no |
| Presence or absence of exposed surface of metal wire net at outer peripheral surface of outer layer |  |  | present | present | present | present | present | present |
| Determination of abnormal noise in test mode (1) | 1st cycle | 500° C. | 0 | 0 | 0 | 0 | 0.5 | 0.5 |
|  |  | 400° C. | 0 | 0 | 0 | 0 | 0.5 | 0.5 |
|  |  | 300° C. | 0 | 0 | 0 | 0 | 0 | 0 |
|  |  | 200° C. | 0 | 0 | 0 | 0 | 0 | 0.5 |
|  |  | 100° C. | 0 | 0 | 0 | 0 | 0 | 0.5 |
|  | 3rd cycle | 500° C. | 0.5 | 0.5 | 0.5 | 0.5 | 1 | 1 |
|  |  | 400° C. | 0.5 | 0.5 | 0.5 | 0.5 | 1 | 1 |
|  |  | 300° C. | 0.5 | 0 | 0.5 | 0.5 | 0.5 | 0.5 |
|  |  | 200° C. | 0.5 | 0 | 0.5 | 0.5 | 0.5 | 0.5 |
|  |  | 100° C. | 0 | 0 | 0 | 0.5 | 0.5 | 0.5 |
|  | 6th cycle | 500° C. | 1 | 0.5 | 0.5 | 1 | 1 | 1 |
|  |  | 400° C. | 1 | 0.5 | 0.5 | 1 | 1 | 0.5 |
|  |  | 300° C. | 1 | 0.5 | 0.5 | 0.5 | 1 | 0.5 |
|  |  | 200° C. | 0.5 | 0 | 0 | 0.5 | 0.5 | 0.5 |
|  |  | 100° C. | 0.5 | 0 | 0 | 0.5 | 0.5 | 0.5 |
|  | 9th cycle | 500° C. | 1.5 | 1 | 0.5 | 1 | 1 | 1 |
|  |  | 400° C. | 1.5 | 1 | 0.5 | 1 | 1 | 1 |
|  |  | 300° C. | 0.5 | 0.5 | 0.5 | 1 | 0.5 | 1 |
|  |  | 200° C. | 0.5 | 0.5 | 0 | 0.5 | 0.5 | 0.5 |
|  |  | 100° C. | 1 | 0.5 | 0 | 0.5 | 0.5 | 0.5 |
|  | No. of cycles | <Oscillation angle> |  |  |  |  |  |  |
| Determination of abnormal noise in test mode (2) | 1 cycle | ±0.15° | 0 | 0 | Table 6 | 0 | 0 | 0 |
|  |  | ±0.7° | 0 | 0 |  | 0 | 0 | 0 |
|  | 2 cycles | ±0.15° | 0-1 | 0-1 |  | 0-1 | 0-1 | 0-1 |
|  |  | ±0.7° | 0.5-1.5 | 0.5-1.5 |  | 0.5-1.5 | 0.5-1 | 0-1 |
|  | 3 cycles | ±0.15° | 0.5-1 | 0.5-1 |  | 0-1 | 0.5-1 | 1-1.5 |
|  |  | ±0.7° | 0.5-1.5 | 0.5-1.5 |  | 0.5-1.5 | 0.5-1.5 | 0.5-1.5 |
| Overall judgment of presence or absence of abnormal noise |  |  | accepted | accepted | accepted | accepted | accepted | accepted |
| <Amount of gas leakage (l/min)> |  | (1) | 0.05 | 0.05 | 0.05 | 0.05 | 0.05 | 0.05 |
|  |  | (2) | 0.13 | 0.10 | 0.10 | 0.10 | 0.12 | 0.15 |
|  |  | (3) | 0.23 | 0.22 | 0.20 | 0.21 | 0.26 | 0.26 |
|  |  | (4) | 0.36 | 0.36 | 0.32 | 0.33 | 0.34 | 0.35 |

TABLE 3

|  |  |  | Examples | | | | | |
| --- | --- | --- | --- | --- | --- | --- | --- | --- |
|  |  |  | 13 | 14 | 15 | 16 | 17 | 18 |
| <Solid lubricant of outer layer> |  |  |  |  |  |  |  |  |
| PTFE |  |  | 20 | 25 | 20 | 25 | 35 | 20 |
| FEP |  |  | 20 | 25 | 28 | 25 | 15 | 28 |
| h-BN |  |  | 40 | 43 | 50 | 50 | 50 | 50 |
| Hydrated alumina (bainite) |  |  | 20 | 7 | 2 | — | — | 2 |
| Sintered or not |  |  | no | no | no | sintered | sintered | sintered |
| Presence or absence of exposed surface of metal wire net at outer peripheral surface of outer layer |  |  | present | present | present | present | present | present |
| Determination of abnormal noise in test mode (1) | 1st cycle | 500° C. | 0.5 | 0.5 | 0 | 0 | 0.5 | 0.5 |
|  |  | 400° C. | 0.5 | 0.5 | 0 | 0 | 0.5 | 0.5 |
|  |  | 300° C. | 0.5 | 0 | 0 | 0 | 0 | 0 |
|  |  | 200° C. | 0 | 0 | 0 | 0 | 0 | 0 |
|  |  | 100° C. | 0 | 0 | 0 | 0 | 0 | 0 |
|  | 3rd cycle | 500° C. | 1 | 0.5 | 0.5 | 1 | 1 | 1 |
|  |  | 400° C. | 1 | 0.5 | 0.5 | 1 | 1 | 1 |
|  |  | 300° C. | 1 | 0.5 | 0.5 | 0.5 | 0.5 | 0.5 |
|  |  | 200° C. | 0.5 | 0 | 0 | 0.5 | 0.5 | 0.5 |
|  |  | 100° C. | 0.5 | 0 | 0 | 0.5 | 0.5 | 0.5 |
|  | 6th cycle | 500° C. | 1.5 | 1.5 | 0.5 | 1 | 1.5 | 1.5 |
|  |  | 400° C. | 1.5 | 1 | 0.5 | 1 | 1.5 | 1.5 |
|  |  | 300° C. | 1.5 | 1 | 0.5 | 0.5 | 1 | 1 |
|  |  | 200° C. | 1 | 0.5 | 0.5 | 0.5 | 1 | 1 |
|  |  | 100° C. | 1 | 0.5 | 0.5 | 0.5 | 1 | 1 |

TABLE 3-continued

|  |  |  | Examples | | | | | |
|---|---|---|---|---|---|---|---|---|
|  |  |  | 13 | 14 | 15 | 16 | 17 | 18 |
|  | 9th cycle | 500° C. | 1.5 | 1.5 | 1 | 0.5 | 1.5 | 1.5 |
|  |  | 400° C. | 1.5 | 1.5 | 1 | 0.5 | 1.5 | 1.5 |
|  |  | 300° C. | 1.5 | 1 | 1 | 0.5 | 1.5 | 1.5 |
|  |  | 200° C. | 1.5 | 1 | 1 | 0.5 | 1 | 1 |
|  |  | 100° C. | 1.5 | 1 | 1 | 0.5 | 1 | 1 |
|  | No. of cycles | <Oscillation angle> |  |  |  |  |  |  |
| Determination of abnormal noise in test mode (2) | 1 cycle | ±0.15° | 0-0.5 | 0 | Table 7 | 0 | Table 8 | 0 |
|  |  | ±0.7° | 0-0.5 | 0 |  | 0 |  | 0-0.5 |
|  | 2 cycles | ±0.15° | 0.5-1 | 0-0.5 |  | 0-1 |  | 0-1.5 |
|  |  | ±0.7° | 0.5-1 | 0-0.5 |  | 0.5-1 |  | 0.5-1.5 |
|  | 3 cycles | ±0.15° | 1-1.5 | 0.5-1.5 |  | 0.5-1 |  | 0.5-1.5 |
|  |  | ±0.7° | 1-1.5 | 0.5-1.5 |  | 0.5-1.5 |  | 0.5-1.5 |
| Overall judgment of presence or absence of abnormal noise |  |  | accepted | accepted | accepted | accepted | accepted | accepted |
| <Amount of gas leakage (l/min)> |  | (1) | 0.0 | 0.05 | 0.05 | 0.05 | 0.05 | 0.05 |
|  |  | (2) | 0.15 | 0.12 | 0.10 | 0.12 | 0.16 | 0.16 |
|  |  | (3) | 0.28 | 0.23 | 0.22 | 0.24 | 0.28 | 0.28 |
|  |  | (4) | 0.40 | 0.38 | 0.36 | 0.38 | 0.40 | 0.38 |

TABLE 4

|  |  |  | Examples | | | Comparative Examples | | |
|---|---|---|---|---|---|---|---|---|
|  |  |  | 19 | 20 | 21 | 1 | 2 | 3 |
| <Solid lubricant of outer layer> |  |  |  |  |  |  |  |  |
| PTFE |  |  | 10 | 25 | 20 | 100 | 100 | 60 |
| FEP |  |  | 40 | 25 | 28 | — | — | — |
| h-BN |  |  | 50 | 50 | 50 | — | — | 40 |
| Hydrated alumina (bainite) |  |  | — | — | 2 | — | — | — |
| Sintered or not |  |  | no | no | no | no | sintered | no |
| Presence or absence of exposed surface of metal wire net at outer peripheral surface of outer layer |  |  | absent | absent | absent | absent | absent | absent |
| Determination of abnormal noise in test mode (1) | 1st cycle | 500° C. | 0 | 0 | 0 | 0.5 | 0.5 | 0 |
|  |  | 400° C. | 0 | 0 | 0 | 0 | 0 | 3 |
|  |  | 300° C. | 0 | 0 | 0 | 0 | 0 | 3.5 |
|  |  | 200° C. | 0 | 0 | 0 | 0 | 0 | 0.5 |
|  |  | 100° C. | 0 | 0 | 0 | 0 | 0 | 0 |
|  | 3rd cycle | 500° C. | 0.5 | 0.5 | 0.5 | 1.5 | 1.5 | 0 |
|  |  | 400° C. | 0.5 | 0.5 | 0.5 | 1 | 1 | 3.5 |
|  |  | 300° C. | 0.5 | 0.5 | 0.5 | 1 | 1 | 4 |
|  |  | 200° C. | 1 | 1 | 1 | 0.5 | 0.5 | 0.5 |
|  |  | 100° C. | 1 | 1 | 1 | 0 | 0 | 0 |
|  | 6th cycle | 500° C. | 0.5 | 0.5 | 0.5 | 4.5 | 4.5 | 1 |
|  |  | 400° C. | 1 | 0.5 | 0.5 | 1 | 1 | 2.5 |
|  |  | 300° C. | 1 | 1 | 0.5 | 1 | 1 | 3.5 |
|  |  | 200° C. | 1.5 | 1 | 1 | 0.5 | 0.5 | 1 |
|  |  | 100° C. | 1.5 | 1.5 | 1 | 0.5 | 0.5 | 0.5 |
|  | 9th cycle | 500° C. | 0.5 | 0.5 | 1 | 4.5 | 4.5 | 1.5 |
|  |  | 400° C. | 1 | 1 | 1 | 2 | 2 | 3 |
|  |  | 300° C. | 1 | 1.5 | 1 | 1.5 | 1.5 | 4 |
|  |  | 200° C. | 1.5 | 1.5 | 1.5 | 1 | 1 | 2 |
|  |  | 100° C. | 1.5 | 1.5 | 1.5 | 0.5 | 0.5 | 0.5 |
|  | No. of cycles | <Oscillation angle> |  |  |  |  |  |  |
| Determination of abnormal noise in test mode (2) | 1 cycle | ±0.15° | 0-0.5 | 0-0.5 | 0-0.5 | 0-3 | Table 9 | 0-3 |
|  |  | ±0.7° | 0.5-1 | 0.5-1 | 0.5-1 | 0.5-2.5 |  | 0.5-2.5 |
|  | 2 cycles | ±0.15° | 0.5-1 | 0.5-1 | 0.5-1.5 | 0.5-3.5 |  | 0.5-3 |
|  |  | ±0.7° | 0.5-1 | 0.5-1 | 0.5-1.5 | 0.5-2.5 |  | 0.5-2.5 |
|  | 3 cycles | ±0.15° | 0.5-1 | 0.5-1 | 0.5-1.5 | 0.5-4 |  | 0.5-3.5 |
|  |  | ±0.7° | 0.5-1.5 | 0.5-1.5 | 0.5-1.5 | 0.5-3.5 |  | 0.5-3.5 |

TABLE 4-continued

|  |  | Examples | | | Comparative Examples | | |
| --- | --- | --- | --- | --- | --- | --- | --- |
|  |  | 19 | 20 | 21 | 1 | 2 | 3 |
| Overall judgment of presence or absence of abnormal noise | | accepted | accepted | accepted | rejected | rejected | rejected |
| <Amount of gas leakage (l/min)> | (1) | 0.05 | 0.05 | 0.05 | 0.05 | 0.05 | 0.06 |
|  | (2) | 0.12 | 0.12 | 0.14 | 0.28 | 0.26 | 0.18 |
|  | (3) | 0.24 | 0.24 | 0.26 | 0.42 | 0.34 | 0.23 |
|  | (4) | 0.36 | 0.36 | 0.40 | 2.16 | 1.96 | 1.76 |

TABLE 5

Example 2

| No. of cycles | Oscillation angle | Measurement Results of Abnormal Noise | | | | | | | |
| --- | --- | --- | --- | --- | --- | --- | --- | --- | --- |
|  |  | 200° C. | 250° C. | 300° C. | 350° C. | 400° C. | 450° C. | 500° C. | 550° C. |
| 1 cycle | ±0.15° | 0 | 0 | 0 | 0 | 0 | 0 | 0 | 0 |
|  | ±0.7° | 0 | 0 | 0 | 0 | 0 | 0 | 0 | 0 |
| 2 cycles | ±0.15° | 0 | 0 | 0 | 0.5 | 0.5 | 0.5 | 0.5 | 0.5 |
|  | ±0.7° | 0 | 0 | 0 | 0.5 | 0.5 | 0.5 | 0.5 | 0.5 |
| 3 cycles | ±0.15° | 0 | 0 | 0 | 0 | 0.5 | 1 | 0.5 | 0.5 |
|  | ±0.7° | 0 | 0 | 0 | 0.5 | 0.5 | 1 | 1 | 1 |

TABLE 6

Example 9

| No. of cycles | Oscillation angle | Measurement Results of Abnormal Noise | | | | | | | |
| --- | --- | --- | --- | --- | --- | --- | --- | --- | --- |
|  |  | 200° C. | 250° C. | 300° C. | 350° C. | 400° C. | 450° C. | 500° C. | 550° C. |
| 1 cycle | ±0.15° | 0 | 0 | 0 | 0 | 0 | 0 | 0 | 0 |
|  | ±0.7° | 0 | 0 | 0 | 0 | 0 | 0 | 0 | 0 |
| 2 cycles | ±0.15° | 0 | 0 | 0 | 0.5 | 0.5 | 0.5 | 0.5 | 0.5 |
|  | ±0.7° | 0 | 0 | 0 | 0.5 | 0.5 | 0.5 | 0.5 | 0.5 |
| 3 cycles | ±0.15° | 0 | 0 | 0 | 1 | 1 | 1 | 1 | 1.5 |
|  | ±0.7° | 0 | 0 | 0.5 | 1 | 1 | 1 | 1 | 1.5 |

TABLE 7

Example 15

| No. of cycles | Oscillation angle | Measurement Results of Abnormal Noise | | | | | | | |
| --- | --- | --- | --- | --- | --- | --- | --- | --- | --- |
|  |  | 200° C. | 250° C. | 300° C. | 350° C. | 400° C. | 450° C. | 500° C. | 550° C. |
| 1 cycle | ±0.15° | 0 | 0 | 0 | 0 | 0 | 0 | 0 | 0 |
|  | ±0.7° | 0 | 0 | 0 | 0 | 0 | 0.5 | 0.5 | 0.5 |
| 2 cycles | ±0.15° | 0 | 0 | 0 | 0 | 0.5 | 0.5 | 1 | 1 |
|  | ±0.7° | 0 | 0.5 | 0.5 | 0.5 | 1 | 1 | 1.5 | 1.5 |
| 3 cycles | ±0.15° | 0 | 0 | 0 | 1 | 1 | 1.5 | 1.5 | 1.5 |
|  | ±0.7° | 0.5 | 0.5 | 1 | 1 | 1.5 | 1.5 | 1.5 | 1.5 |

TABLE 8

Example 17

| No. of cycles | Oscillation angle | Measurement Results of Abnormal Noise | | | | | | | |
| --- | --- | --- | --- | --- | --- | --- | --- | --- | --- |
|  |  | 200° C. | 250° C. | 300° C. | 350° C. | 400° C. | 450° C. | 500° C. | 550° C. |
| 1 cycle | ±0.15° | 0 | 0 | 0 | 0 | 0 | 0 | 0 | 0 |
|  | ±0.7° | 0 | 0 | 0 | 0 | 0 | 0.5 | 0.5 | 0.5 |

TABLE 8-continued

Example 17

| No. of cycles | Oscillation angle | Measurement Results of Abnormal Noise | | | | | | | |
|---|---|---|---|---|---|---|---|---|---|
| | | 200° C. | 250° C. | 300° C. | 350° C. | 400° C. | 450° C. | 500° C. | 550° C. |
| 2 cycles | ±0.15° | 0 | 0 | 0 | 0 | 0.5 | 0.5 | 1 | 1.5 |
| | ±0.7° | 0 | 0.5 | 1 | 1 | 1.5 | 1.5 | 1.5 | 1.5 |
| 3 cycles | ±0.15° | 0 | 0.5 | 0.5 | 1 | 1 | 1.5 | 1.5 | 1.5 |
| | ±0.7° | 0.5 | 1 | 1 | 1.5 | 1.5 | 1.5 | 1.5 | 1.5 |

TABLE 9

Comparative Example 2

| No. of cycles | Oscillation angle | Measurement Results of Abnormal Noise | | | | | | | |
|---|---|---|---|---|---|---|---|---|---|
| | | 200° C. | 250° C. | 300° C. | 350° C. | 400° C. | 450° C. | 500° C. | 550° C. |
| 1 cycle | ±0.15° | 1 | 1 | 1 | 1 | 1 | 1 | 3 | 3 |
| | ±0.7° | 1 | 1 | 1 | 1 | 1 | 3 | 4.5 | 3.5 |
| 2 cycles | ±0.15° | 1 | 1 | 1 | 3 | 3 | 4.5 | 4.5 | 4.5 |
| | ±0.7° | 1 | 1 | 1 | 1 | 1 | 1 | 1 | 3 |
| 3 cycles | ±0.15° | 3 | 3 | 3 | 3 | 3 | 3 | 4.5 | 4.5 |
| | ±0.7° | 1 | 1 | 1 | 1 | 1 | 1 | 3 | 1 |

From the test results, it can be recognized that, in the spherical annular seal members in accordance with Example 1 to Example 21, such a stick-slip phenomenon that would cause in-compartment abnormal noise into the vehicle compartment owing to the propagation of vibration to the exhaust pipe does not occur even in a high-temperature range. From this fact, it can be conjectured that such a stick-slip phenomenon that would cause abnormal noise does not occur in the spherical annular seal member in which the composition ratio of PTFE, FEP, and h-BN contained in the lubricating composition falls within a numerical range corresponding to an interior region bounded by the quadrangle 51 in the ternary composition diagram in FIG. 20, particularly within a numerical range corresponding to an interior region bounded by the hexagon 52 in the ternary composition diagram in FIG. 20, so that it is possible to obtain excellent sliding characteristics even in the high-temperature region. On the other hand, in the spherical annular seal members in accordance with Comparative Example 1 to Comparative Example 3, it can be conjectured that the solid lubricant exposed on the outer surface of the outer layer dropped off or became worn away at a relatively early stage in sliding with the mating member particularly in the high-temperature region, which resulted in a shift to direct sliding with the heat-resistant material constituted by expanded graphite and caused the stick-slip phenomenon, thus generating abnormal noise attributable to the stick-slip phenomenon.

DESCRIPTION OF REFERENCE NUMERALS

4: belt-shaped metal wire net
6: expanded graphite sheet
5: metal wire net
12: superposed assembly
13: tubular base member
20: outer-layer forming member
23: cylindrical preform
30: die
32: cylindrical inner surface
33: partially convex spherical surface
34, 35: annular end face
36: spherical annular base member
37: outer layer
38: spherical annular seal member

The invention claimed is:

1. A spherical annular seal member for use in an exhaust pipe joint, comprising: a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member,
wherein said spherical annular base member includes a reinforcing member made from a metal wire net and a heat-resistant material containing expanded graphite and compressed in such a manner as to fill meshes of the metal wire net of said reinforcing member and to be integrated with said reinforcing member in mixed form,
wherein, in said outer layer, a heat-resistant material containing expanded graphite, a solid lubricant consisting of a lubricating composition containing a polytetrafluoroethylene resin, a tetrafluoroethylene-hexafluoropropylene copolymer, and hexagonal boron nitride, and a reinforcing member made from a metal wire net are compressed such that said heat-resistant material and said solid lubricant are filled in meshes of said reinforcing member, and such that said reinforcing member, said heat-resistant material, and said solid lubricant are integrated in mixed form, and
wherein, in a ternary composition diagram of the polytetrafluoroethylene resin, the tetrafluoroethylene-hexafluoropropylene copolymer, and the hexagonal boron nitride, a composition ratio of the polytetrafluoroethylene resin, the tetrafluoroethylene-hexafluoropropylene copolymer, and the hexagonal boron nitride in the lubricating composition falls within a numerical range corresponding to an interior region bounded by a quadrangle having as vertices a composition point with 10% by mass of the polytetrafluoroethylene resin, 10% by mass of the tetrafluoroethylene-hexafluoropropylene copolymer, and 80% by mass of the hexagonal boron nitride, a composition point with 10% by mass of the polytetrafluoroethylene resin, 45% by mass of the tetrafluoroethylene-hexafluoropropylene copolymer, and 45% by mass of the hexagonal boron nitride, a composition point with 45% by mass of the polytetrafluoroethylene resin, 45% by mass of the tetrafluoroethylene-hexafluoropropylene copolymer, and 10% by mass of the hexagonal boron nitride, and a composition point with 40% by mass of the polytetrafluoroethylene resin, 10% by mass of the tetrafluoroethylene-hexafluoropropylene copolymer, and 50% by mass of the hexagonal boron nitride.

2. The spherical annular seal member according to claim 1, wherein, in the ternary composition diagram of the polytetrafluoroethylene resin, the tetrafluoroethylene-hexafluoropropylene copolymer, and the hexagonal boron nitride, the composition ratio of the polytetrafluoroethylene resin, the tetrafluoroethylene-hexafluoropropylene copolymer, and the hexagonal boron nitride in the lubricating composition falls within a numerical range corresponding to an interior region bounded by a hexagon having as vertices a composition point with 25% by mass of the polytetrafluoroethylene resin, 15% by mass of the tetrafluoroethylene-hexafluoropropylene copolymer, and 60% by mass of the hexagonal boron nitride, a composition point with 12% by mass of the polytetrafluoroethylene resin, 28% by mass of the tetrafluoroethylene-hexafluoropropylene copolymer, and 60% by mass of the hexagonal boron nitride, a composition point with 10% by mass of the polytetrafluoroethylene resin, 40% by mass of the tetrafluoroethylene-hexafluoropropylene copolymer, and 50% by mass of the hexagonal boron nitride, a composition point with 20% by mass of the polytetrafluoroethylene resin, 40% by mass of the tetrafluoroethylene-hexafluoropropylene copolymer, and 40% by mass of the hexagonal boron nitride, a composition point with 38% by mass of the polytetrafluoroethylene resin, 22% by mass of the tetrafluoroethylene-hexafluoropropylene copolymer, and 40% by mass of the hexagonal boron nitride, and a composition point with 35% by mass of the polytetrafluoroethylene resin, 15% by mass of the tetrafluoroethylene-hexafluoropropylene copolymer, and 50% by mass of the hexagonal boron nitride.

3. The spherical annular seal member according to claim 1, wherein said lubricating composition further contains hydrated alumina at a ratio of not more than 20% by mass.

4. The spherical annular seal member according to claim 1, wherein said heat-resistant material contains a phosphate at a ratio of 0.1 to 16% by mass.

5. The spherical annular seal member according to claim 1, wherein said heat-resistant material contains phosphorus pentoxide at a ratio of 0.05 to 5% by mass.

6. The spherical annular seal member according to claim 1, wherein an outer surface of said outer layer is formed into a smooth surface in which areas constituted by said reinforcing member and areas constituted by said solid lubricant are present in mixed form.

7. The spherical annular seal member according to claim 1, wherein an outer surface of said outer layer is formed into a smooth surface constituted by said solid lubricant covering said reinforcing member.

8. The spherical annular seal member according to claim 1, wherein said solid lubricant consists of an unsintered lubricating composition.

9. The spherical annular seal member according to claim 1, wherein said solid lubricant consists of a sintered lubricating composition.

10. A method of manufacturing a spherical annular seal member for use in an exhaust pipe joint and including a spherical annular base member defined by a cylindrical inner surface, a partially convex spherical surface, and large- and small-diameter side annular end faces of said partially convex spherical surface, and an outer layer formed integrally on said partially convex spherical surface of said spherical annular base member, comprising the steps of:
    (a) preparing an expanded graphite sheet serving as a heat-resistant material;
    (b) preparing a metal wire net serving as a reinforcing member and obtained by weaving or knitting a fine metal wire, and, after forming a superposed assembly by superposing said metal wire net on said expanded graphite sheet, convoluting said superposed assembly into a hollow cylindrical shape, to thereby form a tubular base member;
    (c) preparing an aqueous dispersion of a lubricating composition consisting of a polytetrafluoroethylene resin powder, a tetrafluoroethylene-hexafluoropropylene copolymer powder, a hexagonal boron nitride powder, a surfactant, and water;
    (d) preparing another expanded graphite sheet serving as a heat-resistant material, applying said aqueous dispersion onto one surface of said other expanded graphite sheet, and drying the same, to thereby form on a surface of said other expanded graphite sheet a coating layer of a solid lubricant consisting of a polytetrafluoroethylene resin, a tetrafluoroethylene-hexafluoropropylene copolymer, and hexagonal boron nitride;
    (e) superposing said other expanded graphite sheet having said coating layer on another metal wire net serving as a reinforcing member and obtained by weaving or knitting a fine metal wire, and pressurizing a superposed assembly of said other expanded graphite sheet and said other metal wire net by a pair of rollers, to thereby form a flattened outer-layer forming member in which said other expanded graphite sheet and said coating layer are filled in meshes of said other metal wire net;
    (f) convoluting said outer-layer forming member around an outer peripheral surface of said tubular base member with its coating layer facing outside, to thereby form a cylindrical preform; and
    (g) fitting said cylindrical preform over an outer peripheral surface of a core of a die, placing the core in the die, and subjecting said cylindrical preform to compression molding in the die in an axial direction of the core,
    wherein said spherical annular base member is formed so as to be provided with structural integrity as said expanded graphite sheet and said metal wire net are compressed and intertwined with each other, and
    wherein, in said outer layer, said other expanded graphite sheet, said coating layer, and said other metal wire net are compressed such that said other expanded graphite sheet and said coating layer are filled in meshes of said other metal wire net, and such that said other metal wire net, said other expanded graphite sheet, and said coating layer are integrated in mixed form.

11. The method of manufacturing a spherical annular seal member according to claim 10, wherein, in a ternary composition diagram of the polytetrafluoroethylene resin, the tetrafluoroethylene-hexafluoropropylene copolymer, and the hexagonal boron nitride, a composition ratio of the polytetrafluoroethylene resin, the tetrafluoroethylene-hexafluoropropylene copolymer, and the hexagonal boron nitride in the lubricating composition falls within a numerical range corresponding to an interior region bounded by a quadrangle having as vertices a composition point with 10% by mass of the polytetrafluoroethylene resin, 10% by mass of the tetrafluoroethylene-hexafluoropropylene copolymer, and 80% by mass of the hexagonal boron nitride, a composition point with 10% by mass of the polytetrafluoroethylene resin, 45% by mass of the tetrafluoroethylene-hexafluoropropylene copolymer, and 45% by mass of the hexagonal boron nitride, a composition point with 45% by mass of the polytetrafluoroethylene resin, 45% by mass of the tetrafluoroethylene-hexafluoropropylene copolymer, and 10% by mass of the hexagonal boron nitride, and a composition point with 40% by mass of the polytetrafluoroethylene resin, 10% by mass of the tetrafluoroethylene-hexafluoropropylene copolymer, and 50% by mass of the hexagonal boron nitride.

12. The method of manufacturing a spherical annular seal member according to claim 10, wherein, in a ternary composition diagram of the polytetrafluoroethylene resin, the tetrafluoroethylene-hexafluoropropylene copolymer, and the hexagonal boron nitride, the composition ratio of the polytetrafluoroethylene resin, the tetrafluoroethylene-hexafluoropropylene copolymer, and the hexagonal boron nitride in the lubricating composition falls within a numerical range corresponding to an interior region bounded by a hexagon having as vertices a composition point with 25% by mass of the polytetrafluoroethylene resin, 15% by mass of the tetrafluoroethylene-hexafluoropropylene copolymer, and 60% by mass of the hexagonal boron nitride, a composition point with 12% by mass of the polytetrafluoroethylene resin, 28% by mass of the tetrafluoroethylene-hexafluoropropylene copolymer, and 60% by mass of the hexagonal boron nitride, a composition point with 10% by mass of the polytetrafluoroethylene resin, 40% by mass of the tetrafluoroethylene-hexafluoropropylene copolymer, and 50% by mass of the hexagonal boron nitride, a composition point with 20% by mass of the polytetrafluoroethylene resin, 40% by mass of the tetrafluoroethylene-hexafluoropropylene copolymer, and 40% by mass of the hexagonal boron nitride, a composition point with 38% by mass of the polytetrafluoroethylene resin, 22% by mass of the tetrafluoroethylene-hexafluoropropylene copolymer, and 40% by mass of the hexagonal boron nitride, and a composition point with 35% by mass of the polytetrafluoroethylene resin, 15% by mass of the tetrafluoroethylene-hexafluoropropylene copolymer, and 50% by mass of the hexagonal boron nitride.

13. The method of manufacturing a spherical annular seal member according to claim 10, wherein said lubricating composition further contains a hydrated alumina powder at a ratio of not more than 20% by mass.

14. The method of manufacturing a spherical annular seal member according to claim 10, wherein said heat-resistant material contains a phosphate at a ratio of 0.1 to 16% by mass.

15. The method of manufacturing a spherical annular seal member according to claim 10, wherein said heat-resistant material contains phosphorus pentoxide at a ratio of 0.05 to 5% by mass.

16. The method of manufacturing a spherical annular seal member according to claim 10, further comprising the step of sintering said coating layer at a temperature exceeding a melting point of the tetrafluoroethylene-hexafluoropropylene copolymer to form on one surface of said other expanded graphite sheet a sintered coating layer consisting of the sintered solid lubricant, the steps (e), (f), and (g) being performed by using said sintered coating layer as said coating layer, wherein said spherical annular base member is formed so as to be provided with structural integrity as said expanded graphite sheet and said metal wire net are compressed and intertwined with each other, and wherein, in said outer layer, said other expanded graphite sheet, said sintered coating layer, and said other metal wire net are compressed such that said other expanded graphite sheet and said sintered coating layer are filled in meshes of said other metal wire net, and such that said other metal wire net, said other expanded graphite sheet, and said sintered coating layer are integrated in mixed form.

17. The method of manufacturing a spherical annular seal member according to claim 10, wherein, in the step (e), said other expanded graphite sheet is inserted between layers constituted by said other metal wire net, and said other metal wire net with said other expanded graphite sheet inserted between the layers is fed into a nip between a pair of rollers so as to be pressurized, such that said other expanded graphite sheet and said coating layer are filled in meshes of said other metal wire net, to thereby form a flattened outer-layer forming member having a surface in which areas constituted by said other metal wire net and areas constituted by said coating layer are exposed in mixed form.

18. The method of manufacturing a spherical annular seal member according to claim 17, wherein an outer surface of said outer layer is formed into a smooth surface in which areas constituted by said metal wire net and areas constituted by said coating layer are present in mixed form.

19. The method of manufacturing a spherical annular seal member according to claim 10, wherein an outer surface of said outer layer is formed into a smooth surface constituted by said solid lubricant covering said reinforcing member.

20. A spherical annular seal member for use in an exhaust pipe joint, comprising: a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member,
wherein said spherical annular base member includes a reinforcing member made from a metal wire net and a heat-resistant material containing expanded graphite and compressed in such a manner as to fill meshes of the metal wire net of said reinforcing member and to be integrated with said reinforcing member in mixed form, and
wherein, in said outer layer, a heat-resistant material containing expanded graphite, a solid lubricant consisting of a lubricating composition containing a polytetrafluoroethylene resin, at least one kind of a molten fluorocarbon resin having a melting temperature different from that of the polytetrafluoroethylene resin, and hexagonal boron nitride, and a reinforcing member made from a metal wire net are compressed such that said heat-resistant material and said solid lubricant are filled in meshes of said reinforcing member, and such that said reinforcing member, said heat-resistant material, and said solid lubricant are integrated in mixed form.

21. The spherical annular seal member according to claim 20, wherein said at least one kind of a molten fluorocarbon resin having a melting temperature different from that of the polytetrafluoroethylene resin includes a tetrafluoroethylene-hexafluoropropylene copolymer.

22. The spherical annular seal member according to claim 21, wherein, in a ternary composition diagram of the polytetrafluoroethylene resin, the tetrafluoroethylene-hexafluoropropylene copolymer, and the hexagonal boron nitride, a composition ratio of the polytetrafluoroethylene resin, the tetrafluoroethylene-hexafluoropropylene copolymer, and the hexagonal boron nitride in the lubricating composition falls within a numerical range corresponding to an interior region bounded by a quadrangle having as vertices a composition point with 10% by mass of the polytetrafluoroethylene resin, 10% by mass of the tetrafluoroethylene-hexafluoropropylene copolymer, and 80% by mass of the hexagonal boron nitride, a composition point with 10% by mass of the polytetrafluoroethylene resin, 45% by mass of the tetrafluoroethylene-hexafluoropropylene copolymer, and 45% by mass of the hexagonal boron nitride, a composition point with 45% by mass of the polytetrafluoroethylene resin, 45% by mass of the tetrafluoroethylene-hexafluoropropylene copolymer, and 10% by mass of the hexagonal boron nitride, and a composition point with 40% by mass of the polytetrafluoroethylene resin, 10% by mass of the tetrafluoroethylene-hexafluoropropylene copolymer, and 50% by mass of the hexagonal boron nitride.

23. The spherical annular seal member according to claim 21, wherein, in the ternary composition diagram of the polytetrafluoroethylene resin, the tetrafluoroethylene-hexafluoropropylene copolymer, and the hexagonal boron nitride, the composition ratio of the polytetrafluoroethylene resin, the tetrafluoroethylene-hexafluoropropylene copolymer, and the hexagonal boron nitride in the lubricating composition falls within a numerical range corresponding to an interior region bounded by a hexagon having as vertices a composition point with 25% by mass of the polytetrafluoroethylene resin, 15% by mass of the tetrafluoroethylene-hexafluoropropylene copolymer, and 60% by mass of the hexagonal boron nitride, a composition point with 12% by mass of the polytetrafluoroethylene resin, 28% by mass of the tetrafluoroethylene-hexafluoropropylene copolymer, and 60% by mass of the hexagonal boron nitride, a composition point with 10% by mass of the polytetrafluoroethylene resin, 40% by mass of the tetrafluoroethylene-hexafluoropropylene copolymer, and 50% by mass of the hexagonal boron nitride, a composition point with 20% by mass of the polytetrafluoroethylene resin, 40% by mass of the tetrafluoroethylene-hexafluoropropylene copolymer, and 40% by mass of the hexagonal boron nitride, a composition point with 38% by mass of the polytetrafluoroethylene resin, 22% by mass of the tetrafluoroethylene-hexafluoropropylene copolymer, and 40% by mass of the hexagonal boron nitride, and a composition point with 35% by mass of the polytetrafluoroethylene resin, 15% by mass of the tetrafluoroethylene-hexafluoropropylene copolymer, and 50% by mass of the hexagonal boron nitride.

24. The spherical annular seal member according to claim 20, wherein said lubricating composition contains hydrated alumina.

25. The spherical annular seal member according to claim 20, wherein said heat-resistant material contains a phosphate.

26. The spherical annular seal member according to claim 20, wherein said heat-resistant material contains phosphorus pentoxide.

27. A spherical annular seal member for use in an exhaust pipe joint, comprising:
   a spherical annular base member defined by a cylindrical inner surface, a partially convex spherical surface, and large- and small-diameter side annular end faces of said partially convex spherical surface; and
   an outer layer formed integrally on said partially convex spherical surface of said spherical annular base member,
   wherein said spherical annular base member includes a reinforcing member made from a metal wire net and a heat-resistant material containing expanded graphite and compressed in such a manner as to fill meshes of the metal wire net of said reinforcing member and to be integrated with said reinforcing member in mixed form, and
   wherein, in said outer layer, a heat-resistant material containing expanded graphite, a solid lubricant consisting of a lubricating composition containing a polytetrafluoroethylene resin, at least one kind of a molten fluorocarbon resin having a melting temperature lower than a melting temperature of the polytetrafluoroethylene resin, and hexagonal boron nitride, and a reinforcing member made from a metal wire net are compressed such that said heat-resistant material and said solid lubricant are filled in meshes of said reinforcing member, and such that said reinforcing member, said heat-resistant material, and said solid lubricant are integrated in mixed form.

* * * * *